(12) United States Patent
Murakowski et al.

(10) Patent No.: US 10,911,142 B2
(45) Date of Patent: *Feb. 2, 2021

(54) DISTRIBUTED ARRAY FOR DIRECTION AND FREQUENCY FINDING

(71) Applicant: PHASE SENSITIVE INNOVATIONS, INC., Newark, DE (US)

(72) Inventors: Janusz Murakowski, Bear, DE (US); Chris Schuetz, Avondale, PA (US); Garrett Schneider, New Castle, DE (US); Shouyuan Shi, Newark, DE (US)

(73) Assignee: Phase Sensitive Innovations, Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,984

(22) Filed: Feb. 25, 2019

(65) Prior Publication Data

US 2019/0190599 A1    Jun. 20, 2019

Related U.S. Application Data

(60) Continuation of application No. 16/010,090, filed on Jun. 15, 2018, now Pat. No. 10,218,438, which is a
(Continued)

(51) Int. Cl.
*H04B 10/11* (2013.01)
*H04B 10/60* (2013.01)
(Continued)

(52) U.S. Cl.
CPC .............. *H04B 10/11* (2013.01); *H04B 7/08* (2013.01); *H04B 10/00* (2013.01); *H04B 10/60* (2013.01); *H04B 2210/006* (2013.01)

(58) Field of Classification Search
CPC .......... H04B 10/11; H04B 10/60; H04B 7/08; H04B 10/2575; H04B 10/69; H04B 10/00; H04B 2210/006
See application file for complete search history.

(56) References Cited

U.S. PATENT DOCUMENTS

| 4,748,686 | A | * | 5/1988 | Glomb | ................... G01D 5/268 324/96 |
| 4,802,149 | A | * | 1/1989 | Moore | ...................... G01S 3/74 342/108 |

(Continued)

FOREIGN PATENT DOCUMENTS

WO      2010/085889 A1      8/2010

OTHER PUBLICATIONS

International Search Report and Written Opinion for International Application No. PCT/US2016/045424, dated Dec. 30, 2016.
(Continued)

*Primary Examiner* — Mina M Shalaby
(74) *Attorney, Agent, or Firm* — Muir Patent Law, PLLC

(57) ABSTRACT

An optical imaging system and method that reconstructs RF sources in k-space by utilizing interference amongst modulated optical beams. The system and method involves recording with photodetectors the interference pattern produced by RF-modulated optical beams conveyed by optical fibers having unequal lengths. The photodetectors record the interference, and computational analysis using known tomography reconstruction methods is performed to reconstruct the RF sources in k-space.

43 Claims, 18 Drawing Sheets

Related U.S. Application Data division of application No. 15/227,859, filed on Aug. 3, 2016, now Pat. No. 10,009,098.

(60) Provisional application No. 62/200,626, filed on Aug. 3, 2015.

(51) Int. Cl.
    *H04B 7/08*    (2006.01)
    *H04B 10/00*   (2013.01)

(56) References Cited

U.S. PATENT DOCUMENTS

| | | | | |
|---|---|---|---|---|
| 5,253,171 | A | | 10/1993 | Hsiao et al. |
| 5,274,381 | A | * | 12/1993 | Riza ............... H04B 10/64 |
| | | | | 342/368 |
| 5,477,230 | A | * | 12/1995 | Tsui ................. G01S 3/46 |
| | | | | 342/156 |
| 5,923,291 | A | | 7/1999 | Page |
| 6,091,523 | A | * | 7/2000 | Brandstetter ...... H04B 10/671 |
| | | | | 342/58 |
| 6,777,684 | B1 | * | 8/2004 | Volkov ............ G01N 21/3581 |
| | | | | 250/341.1 |
| 7,187,492 | B1 | * | 3/2007 | Shay .................. H01S 3/2383 |
| | | | | 342/371 |
| 7,436,588 | B2 | * | 10/2008 | Rothenberg ....... B23K 26/0604 |
| | | | | 359/349 |
| 7,903,257 | B2 | * | 3/2011 | de Boer ............. A61B 5/0059 |
| | | | | 356/456 |
| 8,223,128 | B1 | * | 7/2012 | Edwards ............ G06F 3/0202 |
| | | | | 345/170 |
| 2005/0046861 | A1 | | 3/2005 | Morison et al. |
| 2006/0145920 | A1 | * | 7/2006 | Stephens ............ H01Q 3/2676 |
| | | | | 342/368 |
| 2010/0197261 | A1 | | 8/2010 | Zibrik et al. |
| 2010/0221015 | A1 | * | 9/2010 | Williams ............... G01S 3/22 |
| | | | | 398/115 |
| 2011/0073772 | A1 | * | 3/2011 | Schuetz ................ G01S 13/89 |
| | | | | 250/395 |
| 2013/0293411 | A1 | | 11/2013 | Dehlink et al. |
| 2014/0015546 | A1 | | 1/2014 | Frederick |
| 2014/0086469 | A1 | | 3/2014 | Lefebvre et al. |
| 2014/0192161 | A1 | * | 7/2014 | Murakowski ........... H04N 5/30 |
| | | | | 348/46 |
| 2015/0346340 | A1 | | 12/2015 | Yaacobi et al. |
| 2016/0006516 | A1 | * | 1/2016 | Schuetz ........... H04B 10/25759 |
| | | | | 398/115 |
| 2017/0041068 | A1 | * | 2/2017 | Murakowski .......... H04B 10/11 |

OTHER PUBLICATIONS

Supplementary European Search Report dated Mar. 8, 2019 for corresponding application EP 16833835.8.

* cited by examiner

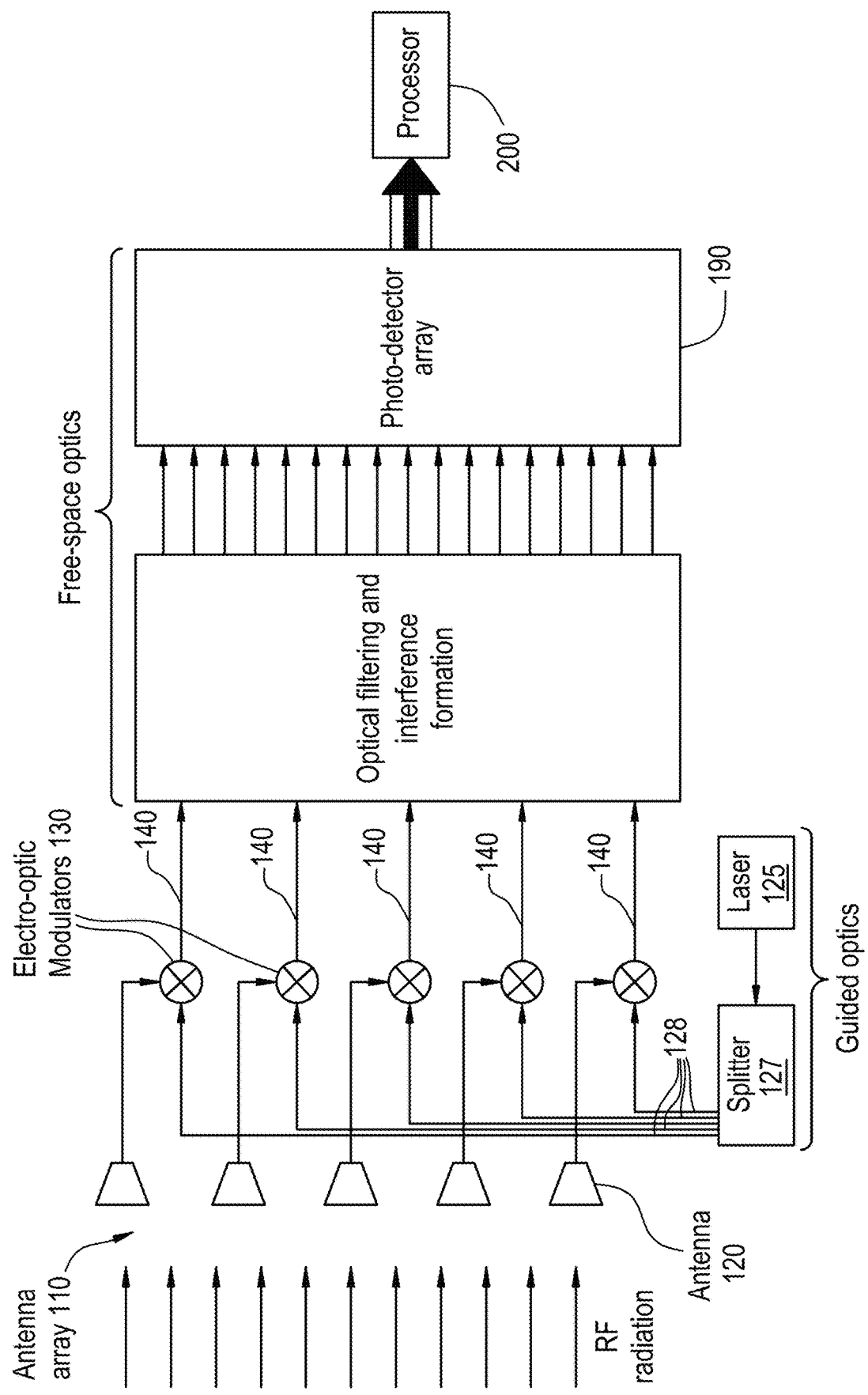

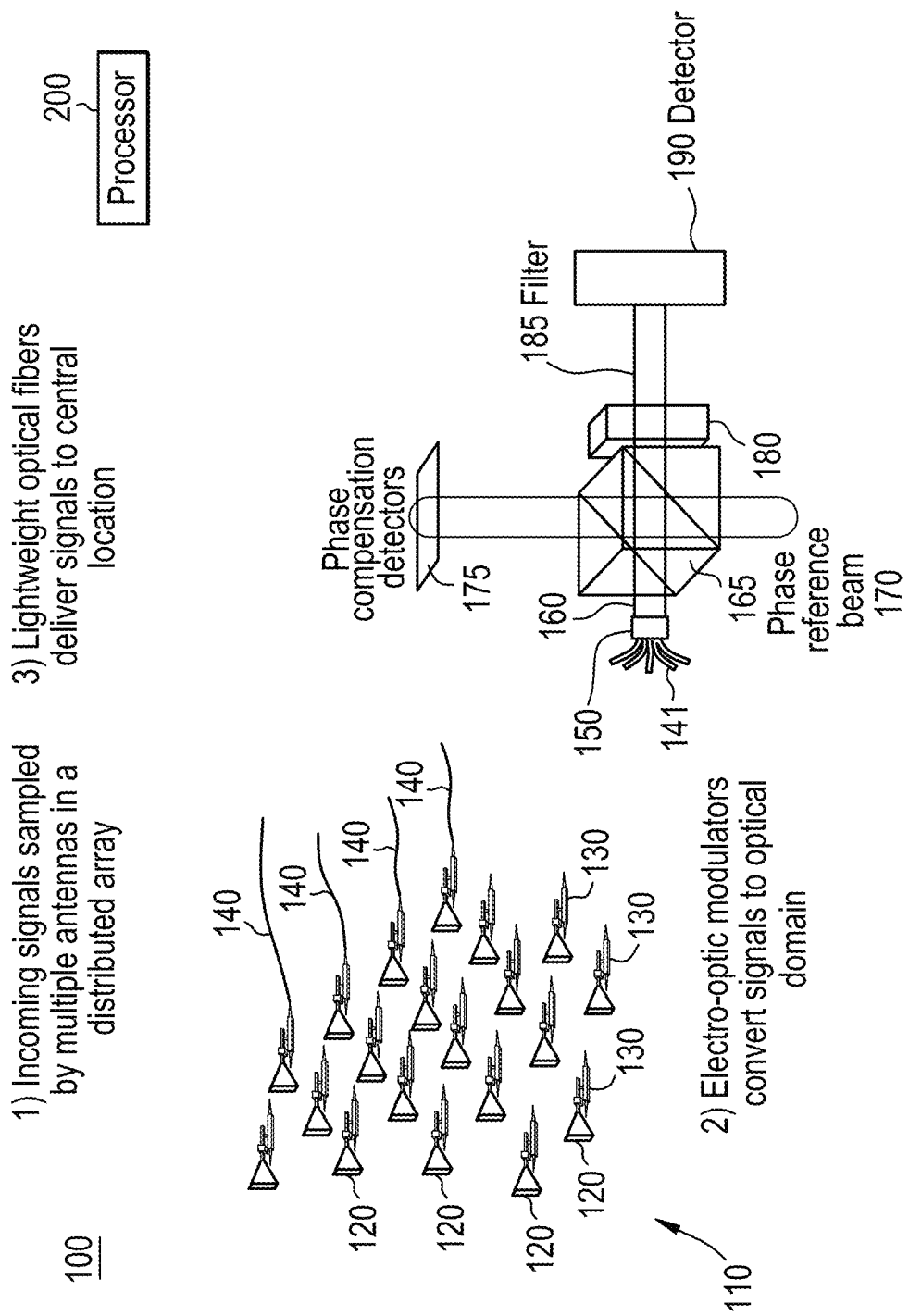

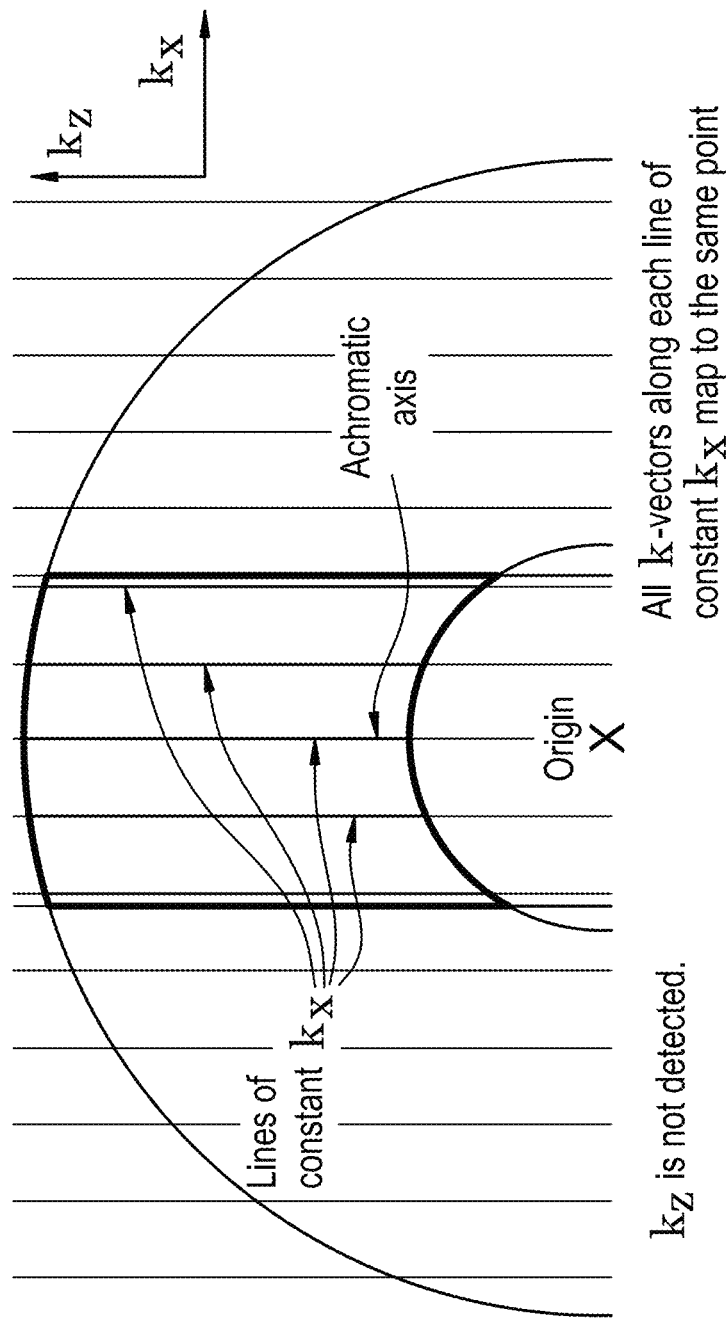

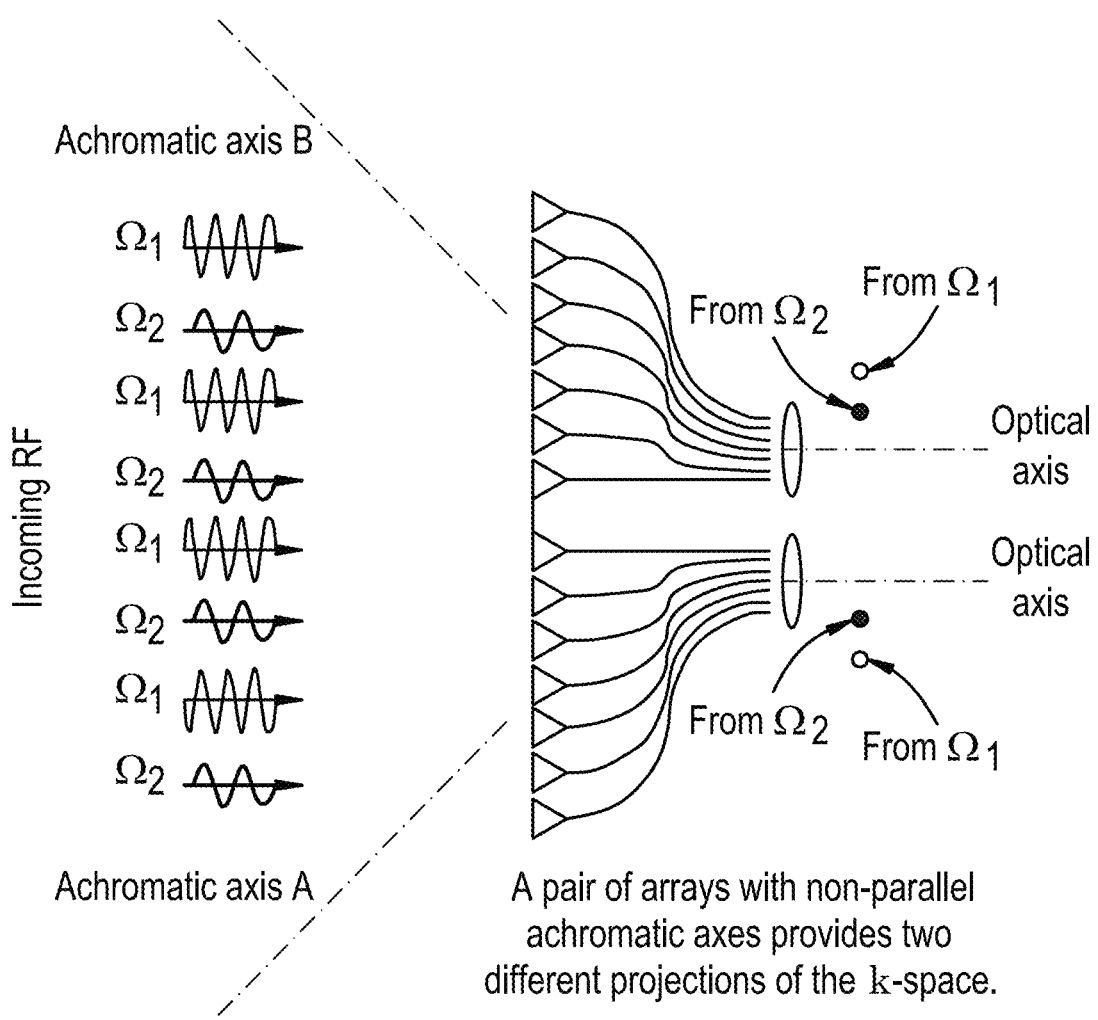

Two imaging receivers coupled to a distributed aperature with fixed-size antennas Probed k-space region is projected along two sets of lines of projection.

$k_z$ and $k_x$ are mixed differently in the two projections.

All k-vectors along each line of projection map to the same point in each receiver.

DISTRIBUTED ARRAY FOR DIRECTION AND FREQUENCY FINDING

CROSS-REFERENCES TO RELATED APPLICATIONS

This application is a Continuation of U.S. application Ser. No. 16/010,090 filed Jun. 15, 2018, which is a Divisional of U.S. application Ser. No. 15/227,859 filed Aug. 3, 2016 which claims the benefit of U.S. Provisional Application No. 62/200,626 filed on Aug. 3, 2015, the disclosure of each of these applications hereby being incorporated by reference in its entirety.

FIELD OF TECHNOLOGY

The herein described subject matter and associated exemplary implementations are directed to improvements and extensions of an imaging receiver as described in U.S. Pat. No. 7,965,435 and US Patent Publication No. 2016/0006516, the disclosure of each being hereby incorporated by reference in its entirety.

BACKGROUND

Many existing antenna arrays are unable to detect both location and frequency of an incoming RF signal without significant filtering or other processing. In such systems, the received broadband radiation is divided into multiple narrow-band channels that are processed individually to determine the information content, and, potentially, the angle of arrival (AoA) of the received radiation. Such processing requires banks of high-speed receivers to sift through the vast amount of data in search of signals of interest. Imaging receivers may rely on distributed aperture to sample incoming electromagnetic radiation, which is then up-converted to optical domain for conveyance and processing. The up-conversion process preserves the phase and amplitude information of radio frequency (RF) waves in the optical domain, which thereby allows optical reconstruction of the RF scene. However, the optical reconstruction in imaging receivers (the spatial location of the optical signals on the image sensor) is dependent on the frequency of the RF waves. Thus, when there are sources of different RF frequency being processed simultaneously, their locations in the real world could not be previously unambiguously identified by imaging receivers.

SUMMARY

The herein described exemplary implementations provide novel approaches to extracting information about radio frequency (RF) emitters from received electromagnetic radiation ranging between 100 MHz and 300 GHz. The exemplary implementations may provide real-time, simultaneous determination of carrier frequency, amplitude and angle of arrival (AoA). In some exemplary embodiments, instantaneous bandwidth (IBW) may approach 100 GHz. This capability may be achieved without sacrifice of signal-to-noise ratio (SNR), by virtue of an antenna array whose gain more than compensates for the added thermal noise that accompanies such wide IBW. The optical approach may enable the array's entire field of regard (i.e. its full beam steering range) to be continuously detected and processed in real time.

One exemplary implementation of an optical imaging receiver includes a phased array antenna having a plurality of antenna elements arranged in a first pattern configured to receive RF signals from at least one RF source and a plurality of electro-optic modulators corresponding to the plurality of antenna elements, each modulator configured to modulate an optical carrier with a received RF signal to generate a plurality of modulated optical signals. The imaging receiver further includes a plurality of optical channels configured to carry the plurality of modulated optical signals and configured to cause interference amongst the optical signals, each of the plurality of optical channels having an output to emanate the corresponding modulated optical signal out of the corresponding optical channel. The outputs of the plurality of optical channels being arranged in a second pattern which does not correspond to the first pattern of the antenna array. A plurality of photodetectors for recording the optical signal interference and a module for computationally reconstructing RF sources in k-space from the recorded interference are also included.

Another exemplary implementation of an optical imaging receiver includes a phased-array antenna including a plurality of antenna elements arranged in a first pattern configured to receive RF signals from at least one RF source and a plurality of electro-optical modulators corresponding to the plurality of antenna elements, each modulator configured to modulate an optical carrier with a received RF signal to generate a plurality of modulated optical signals. Also included is a plurality of optical fibers arranged in a second pattern which corresponds to the first pattern of the antenna array, with each of the plurality of optical fibers having varying lengths, and a plurality of photodetectors for recording optical signal interference occurring in free space after the optical signals are released from their respective optical fibers. A module is provided for computationally reconstructing RF sources in k-space from the recorded interference.

An exemplary implementation of an imaging method utilized by an imaging receiver includes receiving incoming RF signals at a phased-array antenna including a plurality of antenna elements arranged in a first pattern and modulating the received RF signals from each of the plurality of antenna elements onto an optical carrier to generate a plurality of modulated optical signals. The method also includes directing the plurality of modulated optical signals to a plurality of optical channels, configured to cause interference amongst the optical signals. Each of the plurality of optical channels having an output to emanate the corresponding modulated optical signal out of the corresponding optical channel, the outputs of the plurality of optical channels being arranged in a second pattern which does not correspond to the first pattern of the antenna array. The method further includes providing a plurality of photodetectors for recording the optical signal interference and computationally reconstructing RF sources in k-space from the recorded interference.

Another exemplary implementation of an imaging method utilized by an imaging receiver includes receiving incoming RF signals at a phased-array antenna including a plurality of antenna elements arranged in a first pattern and modulating the received RF signals from each of the plurality of antenna elements onto an optical carrier to generate a plurality of modulated optical signals. The method further includes using a plurality of optical fibers, arranged in a second pattern which corresponds to the first pattern of the antenna array, the optical fibers having varying lengths. The method further includes providing a plurality of photodetectors for recording optical signal interference occurring in free space after the optical signals are released from their respective optical fibers and computationally reconstructing RF sources in k-space from the recorded interference.

Another exemplary implementation comprises an antenna array comprising a plurality of antenna elements arranged in a first pattern configured to receive RF radiation; a plurality of electro-optic modulators corresponding to the plurality of antenna elements, each modulator configured to modulate an optical carrier with the received RF radiation to generate a plurality of modulated optical signals; a plurality of optical channels configured to carry the plurality of modulated optical signals; a plurality of optical phase-adjustment means corresponding to the plurality of the optical channels; a plurality of optical-channel outputs arranged in a second pattern wherein the second pattern is a scaled and substantially planarized version of the first pattern; means for effecting substantially unequal time delays between a wavefront of the received RF radiation and the optical-channel outputs for at least some of the different optical channels; a compound optical channel coupled to the plurality of optical-channel outputs and configured to cause interference amongst the modulated optical signals; and a plurality of photodetectors for recording the optical beam interference; wherein the plurality of optical-phase adjustment means may be adjusted to substantially cancel the unequal RF phase delays incurred due to the unequal time delays at a selected frequency of the RF radiation.

The plurality of optical channels may comprise a plurality of optical fibers; and the means for effecting unequal time delays may comprise unequal lengths of the optical fibers, or true-time-delay elements.

The means for effecting unequal time delays may comprise having the elements of the first pattern non-coplanar.

The system may also comprise means to substantially suppress received RF radiation at frequencies substantially differing from the selected frequency.

The plurality of photodetectors may form an array and/or comprise an image sensor.

BRIEF DESCRIPTION OF DRAWINGS

FIG. 1A is an illustration of an RF receiver in accordance with aspects of the invention;

FIG. 1B is another illustration of an RF receiver in accordance with aspects of the invention;

FIG. 4 is a schematic drawing illustrating k-space representation of the imaging receiver;

FIG. 10 is a schematic drawing illustrating a combination of two off-axis imaging receivers for AoA/frequency disambiguation;

DETAILED DESCRIPTION

Figure 2A:
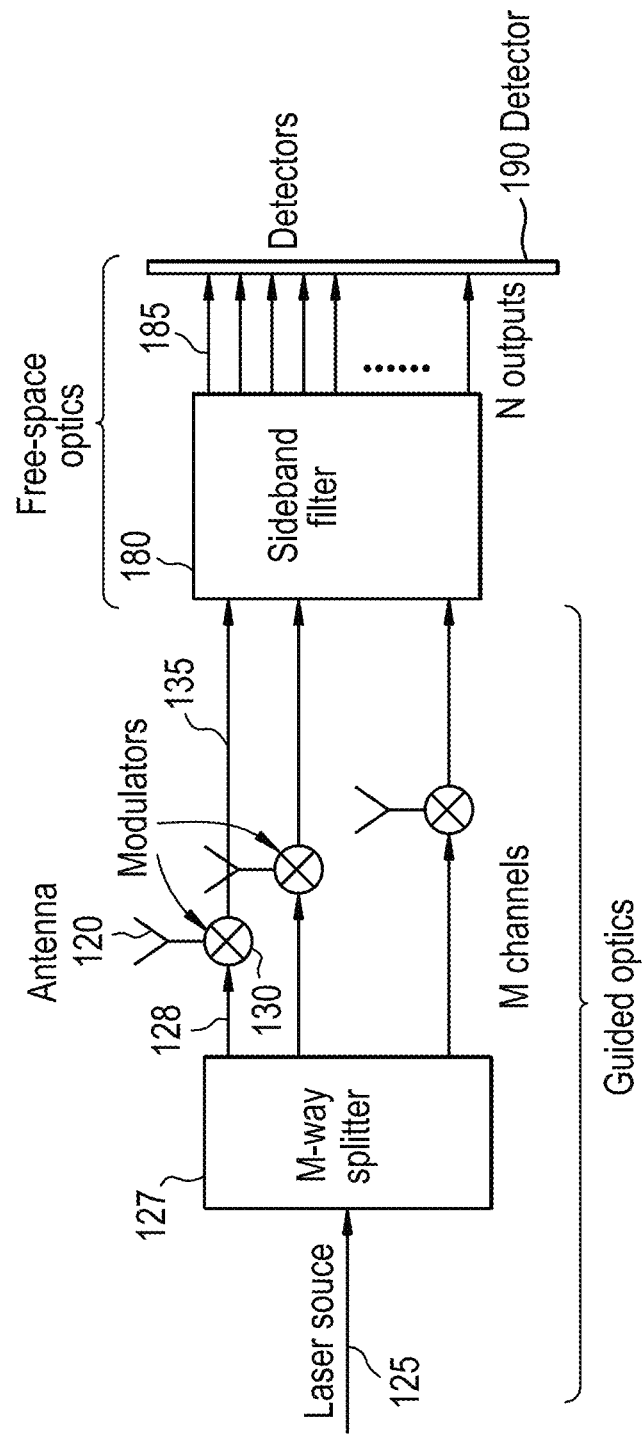
FIGS. 2A, 2B and 2C are a block diagrams of components for use with the RF receiver of FIG. 1A or 1B.

The present disclosure now will be described more fully hereinafter with reference to the accompanying drawings, in which various exemplary implementations are shown. The invention may, however, be embodied in many different forms and should not be construed as limited to the example exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Although the figures described herein may be referred to using language such as "one exemplary implementations," or "certain exemplary implementations," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary implementation.

The terminology used herein is for the purpose of describing particular exemplary implementations only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be further understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between). Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the disclosed technology, features and exemplary implementations are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary implementations may be physically separated into two or more interacting and discrete blocks, units and/or modules without departing from the scope of the inventive concepts. Further, the blocks, units and/or modules of the exemplary implementations may be physically combined into more complex blocks, units and/or modules without departing from the scope of the inventive concepts.

Aspects of the disclosure are related to devices and associated methods for improving a wideband radio-frequency (RF) phased-array receiver. The embodiments described here may determine a signal's angle of arrival (AoA) and frequency in real time. Aspects of the embodiments provide a signal detection mechanism wherein RF signals are upconverted by fiber-coupled electro-optic modulators driven by the antenna elements of a phased array. The conversion results in sidebands on an optical carrier wave supplied by a laser. These optical sidebands are substantially proportional in power to the RF power incident into each antenna element, and also preserve the phase carried by the incident RF signal. This RF upconversion allows the optical sidebands to be used to reconstruct an image of the RF energy in the scene.

An imaging receiver 100 in accordance with aspects of the invention is depicted in FIGS. 1A and 1B wherein similar or like elements are identified by the same reference numerals. The illustrated imaging receiver 100 is a phased-array receiver. The imaging receiver 100 includes a processor 200 coupled to the various components within the receiver to implement the functionality described herein. The processor may be a general purpose processor (e.g., part of a general purpose computer, such as a PC) or dedicated processor (e.g., digital signal processor (DSP), FPGA (field programmable gate array)). The processor may be configured with software to control the component of the imaging receiver 100. Variations of suitable processors for use in the imaging receiver 100 will be understood by one of skill in the art from the description herein.

Figure 2B:
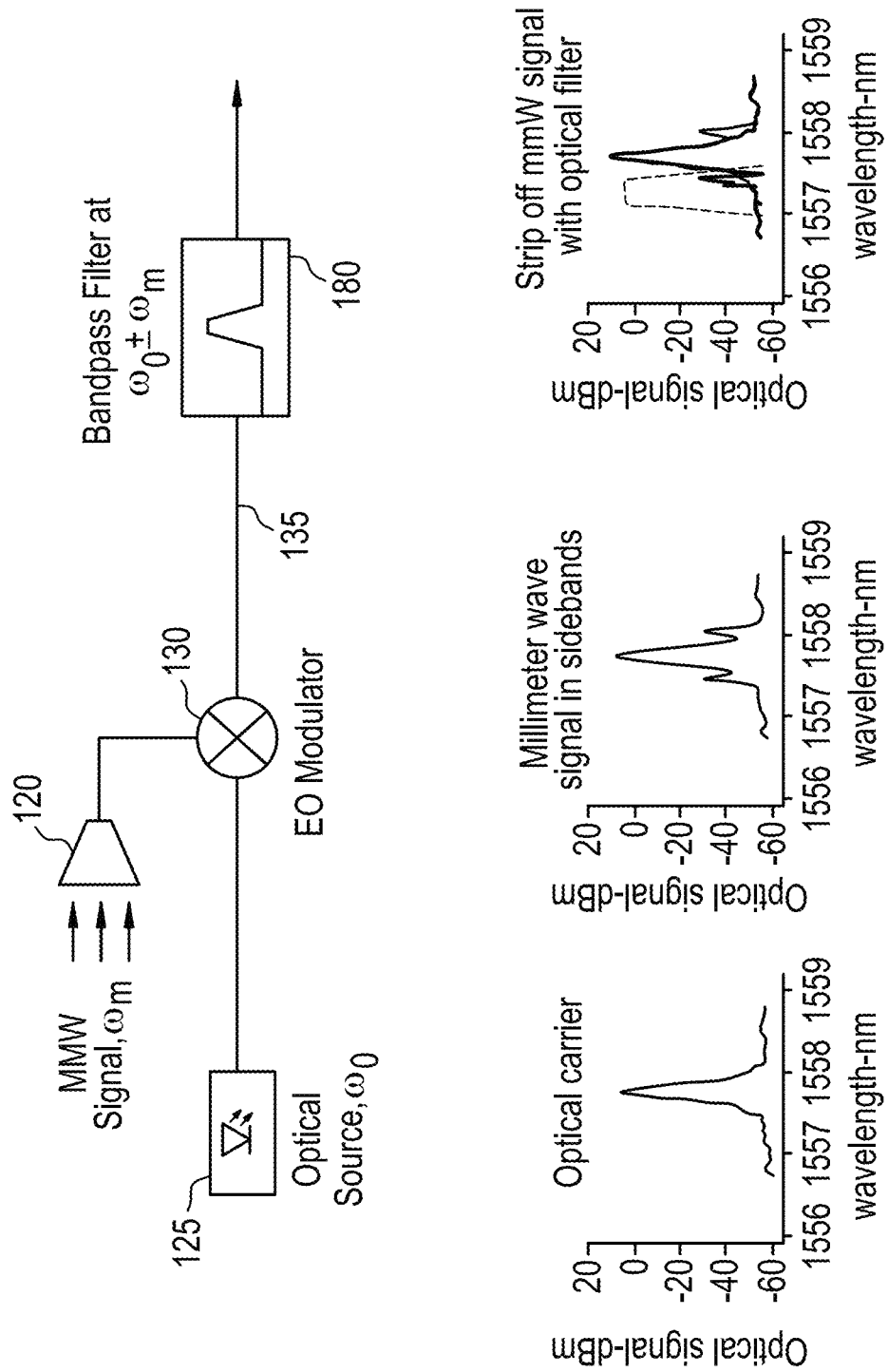

A phased-array antenna 110, e.g., a sparse array of M antenna elements 120 arranged in a first pattern as shown in the example of FIG. 1B, receives RF signals from an external source. Various patterns of the arrangement of the M antenna elements 120 are described further herein, and may include planar arrangements, conformal arrangements conforming to a non-planar three dimensional surface (e.g., a surface of a vehicle, such as the hull of an airplane or helicopter), regularly spaced arrangements (e.g., regularly spaced in a two dimensional array) or an irregularly spaced array. While the antenna elements 120 shown in FIGS. 1A and 1B are horn antennae, those of skill in the art will understand that a variety of antenna means may be used. RF signals sampled at the antenna elements 120 are used to modulate a laser beam split M ways. An electro-optic (EO) modulator 130 is coupled to each of the antenna elements 120 and receives a branch of the split laser beam that it uses to convert the RF energy received at each antenna element 120 to the optical domain. It does so by modulating the optical (carrier) beam produced by the laser 125 (FIGS. 1A, 1B, 2A). The time-variant modulation manifests itself in the frequency domain as a set of sidebands flanking the original carrier frequency (or wavelength), at which the source laser operates, as illustrated in FIG. 2B, which is discussed in more detail below. As a result, the energy radiated in the RF domain appears in the optical domain as sidebands of the carrier frequency. This up-conversion of the RF signal into optical domain may be coherent so that all the phase and amplitude information present in RF is preserved in the optical sidebands. This property of coherence preservation in optical up-conversion allows the recovery of the RF-signal angle of arrival using optical means.

As shown in FIG. 1B, the modulated optical beams containing the laser carrier wavelength and the sidebands with imprinted RF signal are conveyed by optical fibers 140 to a lenslet array 150 (FIG. 1B) coupled to the outputs 141 of the fibers 140 that are arranged in a second pattern. The second pattern may or may not mimic or correspond to the first pattern of the array of the RF antennas at a reduced scale.

Figure 2C:
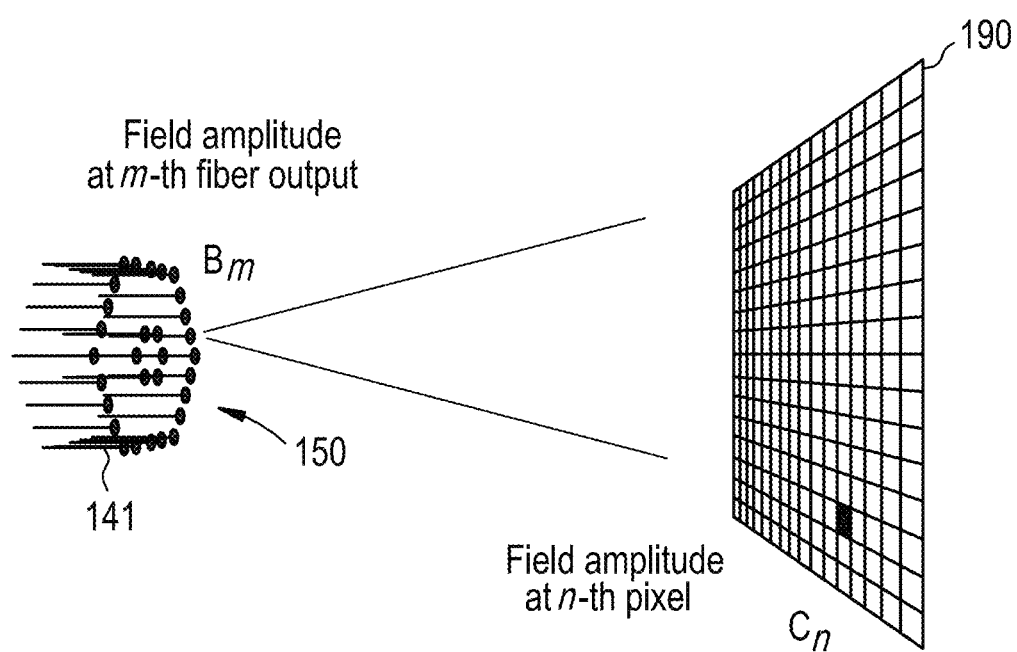

FIG. 2C illustrates the output ends of the optical fibers 140 arranged in a pattern which may correspond to the pattern of the antenna elements 120 of FIG. 1. From the outputs 141 of the optical fibers 140 at the lenslet array 150 on, the beams propagate in free space, no longer guided by the optical fibers, and form a combined beam 160 where the light emanating from fiber outputs interfere. While this embodiment shows conventional optical fibers 140 between the electro-optic modulators 130 and the lenslet array 150, those of skill in the art will appreciate that other optical waveguides or channels may also or instead be used. Similarly, while this embodiment illustrates the use of a free space as a channel for forming a composite optical beams 160 and 185 from light emanating from the outputs of the optical fibers 140, those skilled in the art will appreciate that other optical channels can be used for forming a composite optical beam 160 and/or 185.

As shown in FIG. 1B, the individual beams propagate in free space from the outputs 141 of fibers 140 at the lenslet array 150, which allows the individual beams to interfere with one-another where they overlap to form the combined or composite beam 160. Part of the optical composite beam 160 is split off with a beam-splitter 165, mixed with a reference beam 170, and sent to an array of detectors 175 (phase-compensation detectors) in order to detect, and, if desired, allow for the compensation of, optical phase variation originating in the individual fibers 140 due to environmental conditions such as vibrations and acoustics. An optional band-pass optical filter 180, may strip off the carrier wavelength and allow only one of the sidebands through (see FIG. 2B). The resulting overlapping beams forming a composite beam projected onto photodetector 190, e.g., an image sensor array formed on a semiconductor chip, such as a charge coupled device (CCD) array, CMOS image sensor array, and/or a photodiode array, an optical camera, and/or other standard image sensors. Thus, the overlapping beams form composite beam 185 where they interfere to form a representation of the RF signal in the optical domain.

As shown in FIG. 1A, the free space optics may include optical filtering and interference module 192 and photodetector array 190 which allows the beams emanating from the outputs of fibers 140 to interfere with each other in free space prior to detection and recordation by photodetector array 190.

FIG. 2B illustrates the use of an optical filter 180 to recover or isolate an optical sideband that corresponds to a received RF signal, which may for example be a millimeter wave (MMW) signal having a frequency $\omega_m$. As shown in the graphs of FIG. 2B, the received RF signal(s) from antenna element(s) 120 modulate an optical carrier signal (source) 125 operating at a frequency $\omega_0$ (illustratively at a wavelength between 1557 and 1558 nm). The output 135 of modulator 130 includes an optical analog of the MMW signal in sidebands of the optical carrier as shown in the middle graph. The output 135 of modulator 130 is transmitted via a corresponding optical fiber 140. An optical band-pass filter 180 tuned to $\omega_0+\omega_m$ or $\omega_0-\omega_m$ strips off (isolates) the optical representation of the received MMW signal(s) from the carrier.

FIG. 2A depicts the configuration of an imaging receiver 100 with an emphasis on the optical layer. The single laser source 125 is split M ways by a splitter 127 and the beams 128 are routed through modulators 130 coupled to antennas 120 capturing the RF radiation. The (optical) outputs 135 of the modulators 130 are filtered to allow only a single sideband corresponding to the captured RF radiation to pass, for example using a filter 180 as described with respect to FIG. 2B. The free-space interference of the optical composite beam 185 output from filter 180 among the M different channels yields a pattern measured with detectors 190, as discussed in more detail below.

Note that FIGS. 1 and 2A depict the filter 180 positioned in the free-space portion of the imaging receiver 100 downstream of the lenslet array 150. In some exemplary implementations the filter is optional and is not a necessary component of the system or methodology. In yet other implementations, the filter can be placed anywhere between the modulators 130 and the detector 190 to enable reconstruction of the RF-source position in the optical domain. Furthermore, in some exemplary implementations, especially for frequencies lower than ~5 GHz, a Mach-Zehnder modulator (MZM) may be used to filter out the sideband energy from the optical carrier energy. Such modulators can, under appropriate bias conditions, interferometrically suppress the carrier while passing the (odd-order) sidebands, thereby suppressing the carrier in a frequency-independent manner. In yet other implementations, no physical filter may be used, and the system may rely on the computational reconstruction to account for the presence of the optical carrier in the interference pattern. In yet other implementations, the physical arrangement of the optical channels, including the antennas 120, the lenslet array 150 and/or the optical fiber lengths, and/or the applied optical phases by properly biasing modulators 130, or by other means, may be so organized as to produce the interference pattern of the carrier wavelength significantly separated spatially from the interference pattern produced by the sidebands. Other implementations may combine some or all of the approaches listed above.

The detector 190 of FIGS. 1A and 1B may be an array of photo-detectors such as those of a charged coupled device (CCD) or contact image sensor or CMOS image sensor, which in some embodiments may not be able to process (e.g. decode) information present in the RF signals received by the antenna array 110 with the same performance as high-speed photodiodes. In some exemplary implementations, to extract or recover information encoded in the RF signals input by the antenna elements 120, the composite optical beam output from filter 180 is further split with additional beam-splitters and combined with reference laser beams for heterodyne detection by a high speed photodetector (see, e.g., U.S. Patent Pub. No. 2016/0006516).

Below, further details on the optical capture of the RF scene are presented. To capture the RF scene in the optical domain, the (optical) outputs of the modulators 130 are carried in optical fibers 140 to a lenslet array 150 (FIG. 2C). The arrangement of the optical fibers 140 need not mimic the spatial distribution of the corresponding antennas 120 to which the optical fibers are attached. For example, a sequence of optical fibers along a particular direction may be different than a sequence of the corresponding antennas 120 to which they are attached (a sequence of these antennas 120 along a particular line or curve, e.g.). The fibers may also be split so as to produce a higher number of optical output beams than the number of antennas 120. However, the arrangement of the optical fibers 140 may also mimic the spatial distribution of the antennas 120 to which they are attached. The output beams are then allowed to interfere in free space (or other suitable channel or medium for forming a composite optical signal), and the interference pattern corresponding to the original RF scene is captured by an array of optical sensors such as detector 190 (e.g., a CCD semiconductor chip). Such an interference space may be transparent and may comprise a vacuum, air, a gas other than air, a liquid or a solid (e.g., a lens or a slab waveguide).

Figure 3A:
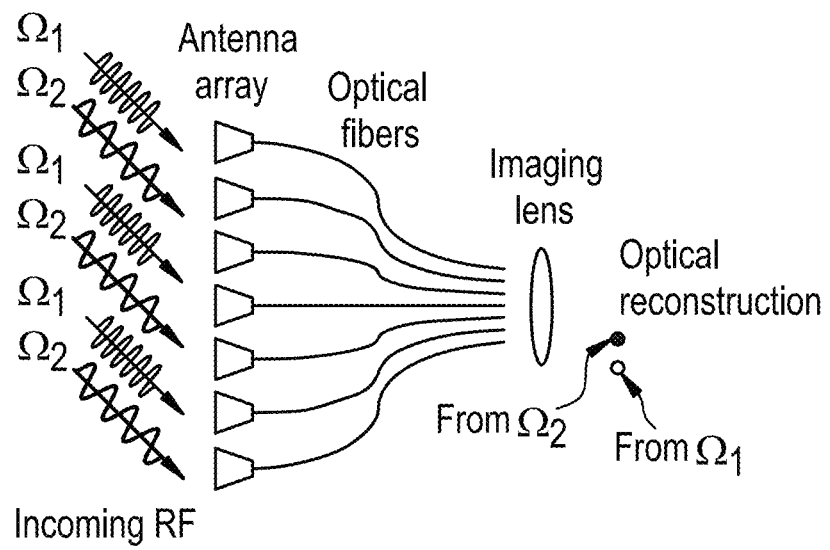
FIGS. 3A, 3B and 3C are schematic drawings illustrating various RF plane waves detected by the imaging receiver of FIG. 1.

Given that the positions of the individual antenna elements 120 in the array 110 are fixed, the phase relations of waves sampled by these elements depend on both the angle of arrival and on the frequency. For example, in a system where the geometry of the lenslet array 150 matches the geometry of the antenna array 110, two waves arriving at the RF aperture from the same direction but differing in frequency will (normally) reconstruct in the optical domain as bright spots in different positions on the image plane (e.g., on photodetector 190 for detection and processing by processor 200), as shown in FIG. 3A. The amount of spatial offset between different RF waves with different frequencies incident upon the array depends on the incidence angle: for waves arriving at the array along the RF imaging axis, or achromatic axis (which may be considered an incidence angle equal to zero), all RF frequencies reconstruct to a single spot lying on the optical axis of the imaging system. The greater the incidence angle of the RF wave with respect to the RF imaging axis, the greater the spread of the resulting optical image as a function frequency. Using the terminology from the field of imaging optics, such spreading of an image due to change in frequency (wavelength) is referred to herein as chromatic aberration.

The effect of chromatic aberration in the imaging receiver with homothetic arrays 110 and 150 is illustrated in FIG. 3A. It will be appreciated that the optical reconstruction referenced below (e.g., detection of optical spots) may be performed by an imaging receiver, such as the imaging receiver 100 described herein. The optical reconstruction may be captured in real time by detector 190 of the imaging receiver 100. For example, the optical dots discussed herein may be detected by detector 190 and processed by processor 200. For such optical reconstruction, the imaging receiver may use a single detector 190 detecting light of a single composite beam 185 formed from one or more optical fiber bundles (where the outputs of the plural optical bundles described herein are combined), or in certain examples, use a single antenna array 120 that has outputs of separate optical fiber bundles to different ones of plural detectors 190, where each detector 190 is associated with separate optical processing elements described here, and each detector 190 is associated with a separate optical fiber bundle. FIG. 3A illustrates incoming RF radiation at frequencies $\Omega_1$ and $\Omega_2$ incident upon the array. The angle of arrival is identical for the two RF beams, but the frequencies (wavelengths) differ. Reconstructed in optical domain, two spatially-separated spots are formed: one corresponding to incoming frequency $\Omega_1$ and the other to $\Omega_2$.

Figure 3B:
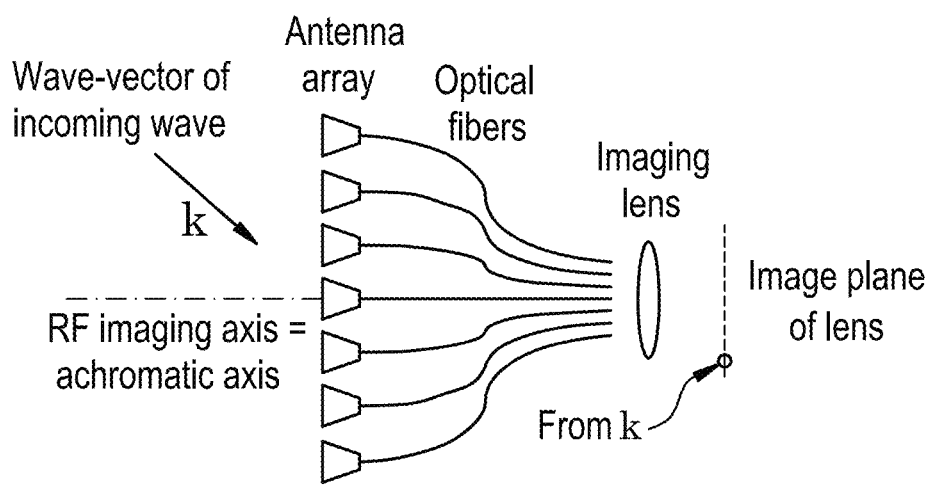
Figure 3C:
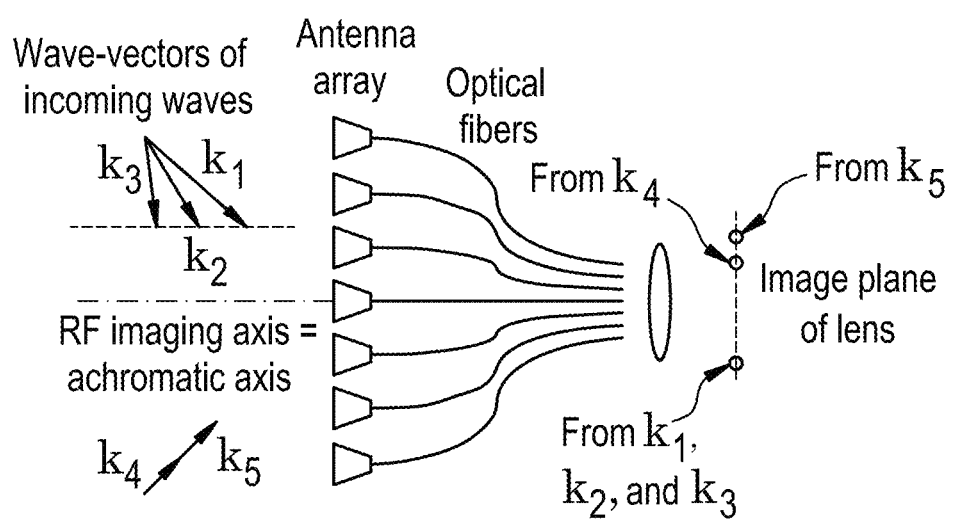

Chromatic aberration can also be understood with the help of wave-vector (or k-space) description of the image reconstruction. An RF plane wave incident upon the antenna array is represented by a wave vector (a k-vector) pointing in a direction perpendicular to the phase-front and having length proportional to the frequency; the k-vector points in the direction of propagation of the wave. The imaging receiver, by virtue of upconverting the RF waves to the optical domain followed by optical reconstruction of the RF waves (e.g., by photodetector 190), may map the k-vectors of the incoming RF waves onto the image plane of the optical lens, see FIG. 3B. The k-vectors corresponding to all possible RF plane waves form a three-dimensional vector space. This 3D space is mapped onto a two-dimensional space: the image plane of the imaging lens, which may correspond to the 2D plane of the photodetector 190 when implemented as an image sensor. The 3D to 2D mapping may be a projection along the achromatic axis of the imaging receiver 100. As a result, k-vectors differing by a vector parallel to the achromatic axis of the imaging receiver 100 are mapped to the same point in the image plane. This situation is shown in FIG. 3C where plane waves corresponding to vectors $k_1$, $k_2$, and $k_3$ are all mapped to a single point in the image plane as they differ from one another by a vector parallel to the achromatic axis. In contrast, wave-vectors $k_4$ and $k_5$ are mapped to two separate points in the image plane even though they are parallel to one another, i.e. they correspond to plane waves coming from the same direction. The difference in length between wave-vectors $k_4$ and $k_5$ is due to the difference in frequency of the underlying RF waves.

In short, the imaging receiver maps the 3D space of wave-vectors to a 2D image plane by projecting the former along the achromatic axis. This leads to chromatic aberration where some waves arriving from the same direction are mapped to different points (e.g. wave-vectors $k_4$ and $k_5$ in FIG. 3C), and certain waves arriving from different directions map to the same point (e.g. wave-vectors $k_1$, $k_2$, and $k_3$ in FIG. 3C).

The above statement can be understood with the help of FIG. 4, which shows a portion of k-space. In this representation, every point is a k-vector (wave-vector) that corresponds to a plane wave arriving at the receiver. The length of the k-vector (the distance of the point from origin located at the center of the semicircles in FIG. 4) is proportional to the frequency and the angle of arrival of the wave is the vector's direction. Given this one-to-one correspondence between waves arriving at the receiver and the points in k-space, the latter is helpful when describing the imaging receiver.

Accordingly, since the imaging receiver performs a projection along the achromatic axis, in k-space this projection takes a geometric meaning: points along each of the lines labeled as "Lines of constant $k_x$" in FIG. 4, are represented as a single point in the imaging receiver in this example. FIG. 4 illustrates just five lines of constant $k_x$ for simplicity. The above perspective on the imaging receiver provides means to generalizing the concept and enabling access to information that is captured by the distributed array. The imaging receiver may include structure to implement one or more of the following features:

- Sampling the incoming electromagnetic field at discrete points using an array of antennas (120).
- Upconversion of the received electromagnetic radiation to optical domain at each of the sampled points. This is accomplished with electro-optic modulators (130).
- Conveying the upconverted signals, now in optical domain, using optical fibers (140), one or more fibers per antenna, to a fiber array.
- Using fiber array that may be a scaled version of the antenna array.
- Free-space propagation (160) and optical processing of light emanating from the output of the fiber array, which contains the information on the received electromagnetic radiation.
- Optical capture of the RF scene: The interference pattern within composite beam 185, at every received RF frequency, may correspond to the RF scene observed by the antenna array. The optical capture of the RF scene may be processed to reconstruct the RF scene.

As described herein, information about radio frequency (RF) emitters from received electromagnetic radiation may be extracted. The exemplary implementations may provide real-time, simultaneous determination of carrier frequency, amplitude and angle of arrival (AoA). In some embodiments, instantaneous bandwidth (IBW) may approach 100 GHz. This capability may be achieved without sacrifice of signal-to-noise ratio (SNR), by virtue of an antenna array whose gain more than compensates for the added thermal noise that accompanies such wide IBW. The optical approach may enable the array's entire field of regard (i.e. its full beam steering range) to be continuously detected and processed in real time.

Optical image formation and engineered spectral dispersion may be used to acquire multiple k-space projections of the RF scene. Optical upconversions of RF signals by high performance modulators enables the use of simple, inexpensive optical components to perform correlations among the signals received by the array elements. For the IBW and resolution (in both frequency and AoA) provided with this approach, such correlations would be intractable using a conventional approach based on downconversion, channelization, A/D conversion and computational correlation. For example, 8-bit digitization of 100 spectral channels, each 100-MHz wide and together spanning 10 GHz, for 1000 simultaneous spatial directions (array beams) requires 20

TB/s of data throughput, not to mention the computational burden of analyzing all that data in real time, nor the sheer size and scale of 1000 parallel channelized receivers.

The optical approach may include the following: RF signals are received by antennas 120 that feed modulators 130, which upconvert the signals onto optical carriers conveyed by fibers 140. The sidebands are launched into free space as a composite optical beam 160 through an output fiber bundle that replicates the arrangement of antennas 120 in the array, at reduced scale. In this way the optical output of the bundle comprises a scaled replica of the RF field incident on the antenna array aperture. In some embodiments, the output of the fiber bundle need not replicate the arrangement of the antennas 120. Simple optical lenses and a camera (focal plane array of detectors 190) can then be used to capture the interference pattern of the composite optical beam 160, from which an optical image of the RF scene may be obtained (i.e. a map of the AoA and amplitude of any and all RF emitters sensed by the antenna array 120). The optical image of the RF scene may be obtained with straightforward computational processing. To add frequency determination to this imaging capability, the lengths of the output fibers are made unequal, so as to introduce a controlled chromatic dispersion (e.g. linearly ramping the length across the array, which is effectively an RF diffraction grating, or implementing lengths that have no correlation (e.g., may be random lengths) across the array), spreading the frequency content of the signals out in the image seen at the camera. Alternatively, or in combination with making the lengths of the optical fibers unequal, the spreading of the frequency content may be achieved by distributing the antennas in a non-coplanar configuration. This spreading of the frequencies mixes the spatial and spectral information about a signal in the image. The modulator outputs may be split into multiple fibers, and multiple output fiber bundles may be used to form multiple images. Each output fiber bundle may contain a different distribution of the fiber lengths, by which each corresponding image represents a different projection of the full spatial-spectral scene.

The most appropriate conceptual framework for understanding this process is k-space. Every RF signal incident on the array can be characterized by a wavevector k, also called a k-vector. K-space is just a uniform equivalent of an abstract space comprised of up to 2 dimensions of AoA (azimuth and elevation) and 1 dimension of (temporal) frequency. Recalling that the magnitude of the wavevector is directly related to frequency according to $2\pi f = ck$, one can readily see that frequency and AoA represent a set of spherical coordinates spanning k-space. Thinking in terms of wavevectors, rather than AoA and frequency, we are free to analyze the scene using other coordinate systems, e.g. Cartesian: $\{k_x, k_y, k_z\}$. Each of the multiple images can be interpreted as a different projection of the full k-space. For example, when all fiber lengths are equal, this corresponds to a projection onto the aperture (x-y) plane, which is insensitive to $k_z$, as shown in FIG. 4. Variation of the lengths provides different projections. As in tomography in real (position) space, which builds 3D images of the interior of structures by combining multiple projections, computational reconstruction techniques can be used to build the full k-space distribution of RF emitters from the multiple projections. From this k-space "scene," the frequency and AoA of each individual emitter can be extracted.

Analysis and simulations show that with this approach, received signals' carrier frequency can be determined to 100 MHz or better, depending on the variation of the lengths of the fibers and signal-to-noise ratio, and this can be accomplished simultaneously for multiple signals at widely disparate frequencies, while simultaneously providing AoA as well. The precision of the AoA determination depends on the ratio of the carrier wavelength to the overall aperture size, as well as SNR: as an example, in the low-noise limit, <1° accuracy can be obtained with a 6-cm array aperture at 18 GHz.

Generalization of Imaging Receiver

The disclosed imaging receiver may be in accordance with one or more of the following features:

- Allowing variation of the fiber length amongst the different optical channels.
- Allowing multiple optical fibers per antenna.
- Allowing arbitrary geometry of the fiber array, not necessarily linked to the geometry of the antenna array.
- Allowing the geometry of the antenna array not to be flat (2D);
- antennas in the array may be distributed in three dimensions, for example following a contour of a curved surface.
- Computational reconstruction of the RF scene that includes extracting both the angle of arrival and frequency of the incoming RF radiation.

The interference pattern produced by light emanating from the optical fibers may no longer correspond directly to the RF scene. Instead, the following general relation holds between the RF sources and the detected optical powers $$P_n = a_n \cdot S \qquad (1)$$

where $a_n$ is a (abstract) vector corresponding to the n-th optical detector, S is a (abstract) vector corresponding to the distribution of sources in the k-space, i.e. the RF scene, and $P_n$ is the power detected by the n-th detector.

Expression (1) can be manipulated to obtain the following equivalent forms $$P_n = \sum_m a_{nm} S_m \qquad (2)$$

$$P = AS$$

where the first of Eqs. (2) explicitly shows the summation of the dot product in Eq. (1) whereas the second of Eqs. (2) shows a compact notation involving matrix multiplication of (sought) vector S by matrix A to obtain the measured vector P of detected optical intensities. In Eq. (2), matrix A is determined by the details of the imaging receiver that include the geometry of the antenna array, the geometry of the fiber array, and the lengths of the fibers, as well as any additional optical phases applied to the optical signals conveyed by the optical channels. Vector S describes the RF scene in k-space, i.e. the frequencies (or frequency distributions), angles of arrival and intensities of the RF sources whose signals are received by the antenna array. Vector P comprises the intensities measured by the photodetectors. Hence, the reconstruction of the RF scene based on detected (measured) optical intensities P may require the 'inversion' of the relation Eq. (2). Since matrix A may in general be rectangular (not square) and/or singular, such 'inversion' may not be well defined in general. In this case, an approximate, and 'most likely' vector S is sought that satisfies Eqs. (2) or Eq. (1). Note also that in Eq. (2), finding the left inverse of matrix A would be sufficient to reconstruct the scene.

There exist a variety of methods that can be used to find S that satisfies, or approximately satisfies, Eqs. (2) or Eq. (1)

given measured/detected P. For example, methods used in computed tomography may be employed that include the algebraic reconstruction technique (ART) also known as Kaczmarz method, or its multiplicative version (MART), or their more sophisticated flavors known to those skilled in the art. Such methods may maximize the entropy, or the relative entropy, or Kulback-Leibler divergence, of the reconstructed RF scene, or, in other words, may find the most likely distribution of RF sources (frequencies, intensities and angles of arrival of the received waves) that would result in the detected values of P. Also, 'inverting' a relation akin to that of Eq. (2) is encountered in compressive-sensing reconstruction. Therefore, methods used in that field may be applicable here.

To facilitate and speed the reconstruction of RF scenes, a look-up table can be constructed by, for example, direct sensing of known scenes which can be augmented by computational processing using known tomography techniques, as described above, on selected matrix entries as necessary. The look-up table may receive inputs comprising one or more pixel coordinates corresponding to the location (s) of detected light by the photodetector 190. Based on receiving these pixel coordinate inputs, the look-up table may output one or more k-space vectors, each k-space vector identifying the frequency and AoA of a corresponding RF source of the RF scene. In some examples, the look-up table may also receive input(s) of the intensity of the detected light by the photodetector corresponding to each of the one or more pixel coordinates and output k-space vector(s) based on such intensity input(s).

Figure 6:
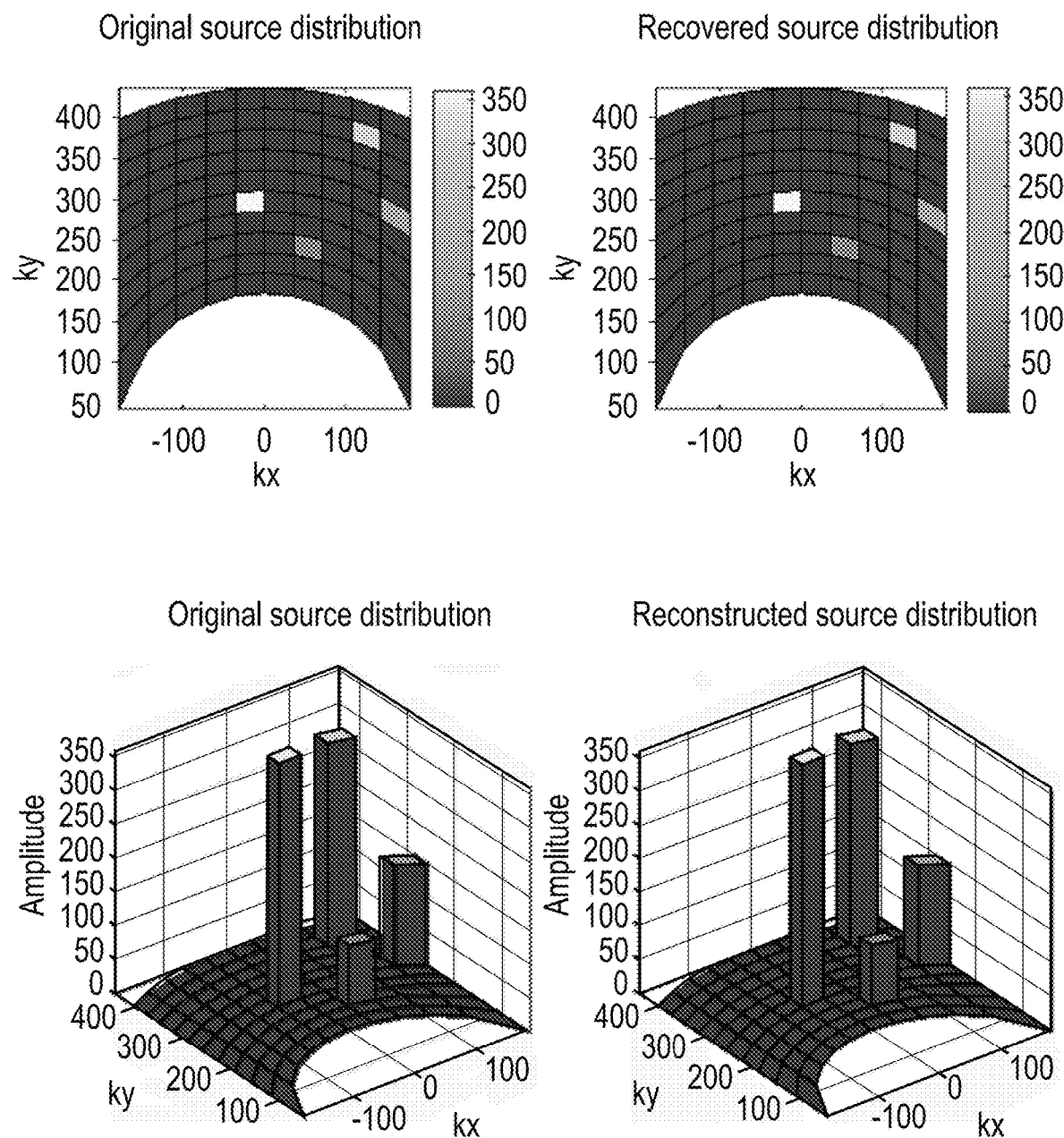
FIG. 6 is a graphical representation of RF scene reconstruction.

FIG. 6 shows an example of RF scene reconstruction using a linear array with randomized antenna position and a random distribution of fiber lengths. On the left is the original (input) distribution of four RF sources present in the scene as represented in k-space. On the right is the reconstruction of the scene by inverting relation (2). Excellent reconstruction fidelity is accomplished in this case.

Figure 7:
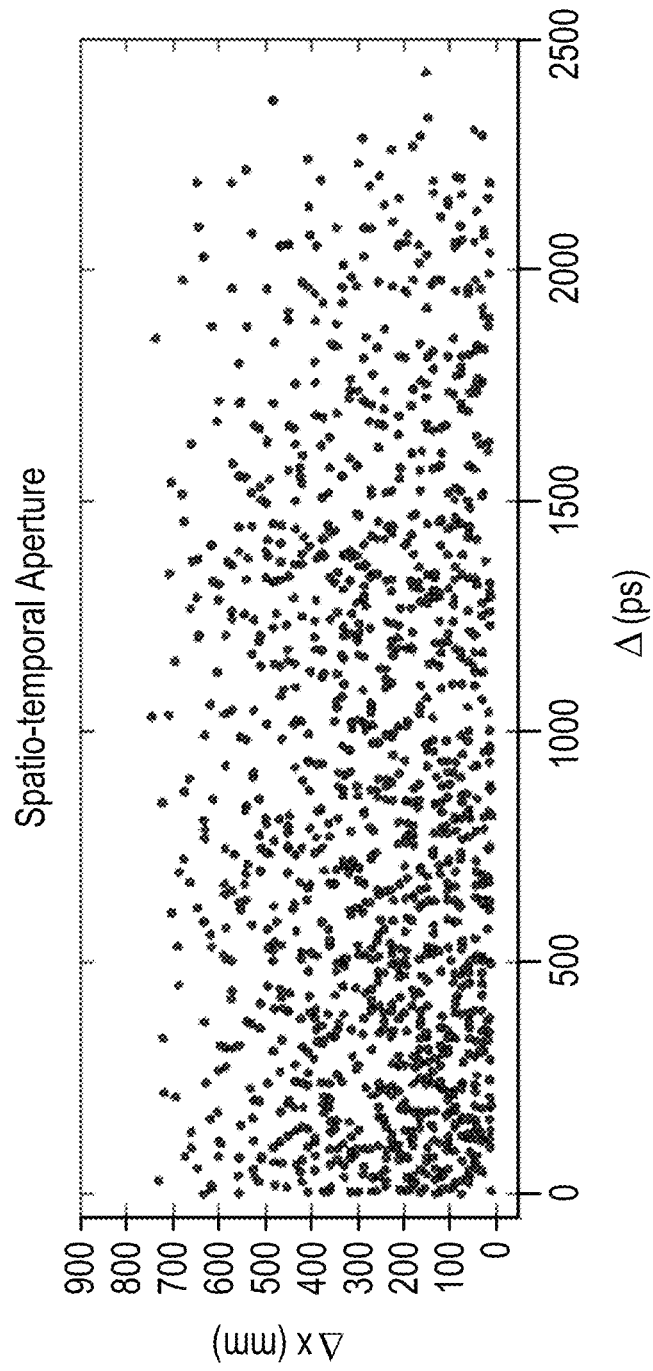
FIG. 7 depicts the sampling of the spatial-temporal aperture used in the reconstruction of FIG. 6.

FIG. 7 shows the distribution of baselines used in the reconstruction of FIG. 6. The baselines are provided by the fiber-length differences ($\Delta t$) and by the separations in the x-direction ($\Delta x$) of the antennas in the array.

The above describes the general mode of operation of the cuing receiver. There may be other modes of operation that may relax the computational burden of extracting the information about the RF scene. Below, examples of some of such modes of operation are described in some detail.

Homothetic Arrays

Figure 2D:
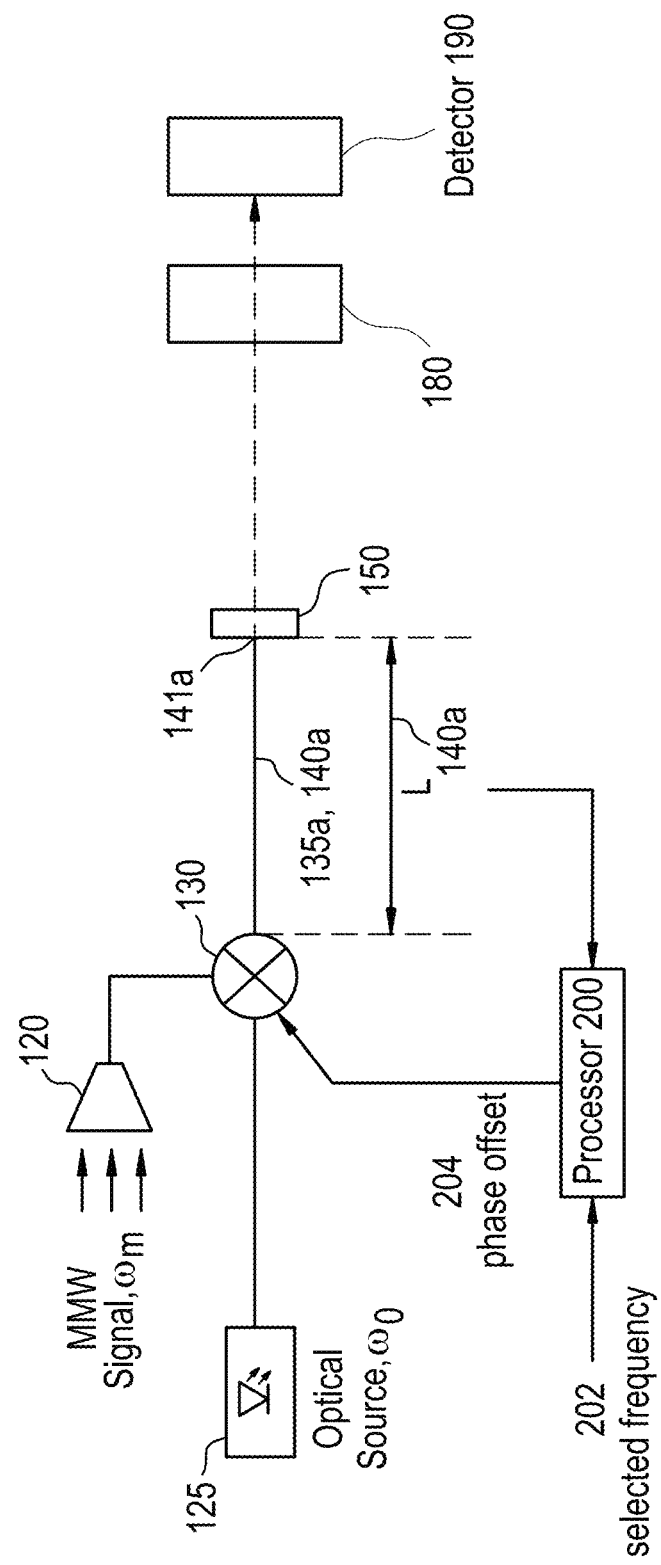
FIG. 2D illustrates details of an embodiment where the detector may capture in real-time an image of a selected frequency of an RF scene.

FIG. 2D illustrates details of an embodiment where the detector 190 may capture in real-time an image (still image and/or video image) of a selected frequency of the RF scene with non-selected frequencies being effectively filtered and treated as noise by the detector 190. In this example, one fiber per antenna may be used and the geometry of the fiber array bundle at lenslet 150 (at the ends 141 of the optical fibers 140) may be a scaled version of the antenna array 120. For example, the ends 141 of the optical fibers 140 may have the same relative physical arrangement as the arrangement of the antenna array 120. For example, a projection of the antenna array 120 onto a plane may have the same relative arrangement as the arrangement of the ends 141 of optical fibers 140 corresponding to the connection of such optical fibers 140 to the associated antenna array 120. The same relative arrangement may include the same relative spacing, same relative order and/or same relative locations with respect to neighboring fiber ends 141.

As shown in FIG. 2D, a phase offset 204 is applied to optical modulator 130 by applying a constant (DC) bias voltage; to obtain optical phase delay $\phi$, voltage $V=(\phi/\pi)*V_\pi$ is applied, where $V_\pi$ is the half-wave voltage of the electro-optic modulator. The phase offset 204 is variable and is based on a selected frequency 202 input to the processor 200 and on the (optical) length of the optical fiber 140a. The processor 200 outputs an appropriate phase offset 204 for each of the modulators 130 of the imaging receiver 100 to compensate for the phase delay the RF signal would experience when traversing the distance $L_{140a}$, which is equal to $\omega_m*L_{140a}/c$, where $\omega_m$ is the selected RF frequency 202, $L_{140a}$ is the optical length of the fiber 140a (time delay multiplied by the speed of light) and c is the speed of light. Note that the applied optical phase offset to cancel the accrued RF phase delay need only be applied modulo $2\pi$. Since the phase delay, $\omega_m*L_{140a}/c$, of the RF signal is an explicit function of the selected frequency 202, $\omega_m$, the applied optical phase compensation provides phase cancellation only for that selected RF frequency. Similarly, different optical lengths $L_{140a}$ require different optical phase compensations.

With these phase offsets applied to each of the modulators 130, despite the different lengths of the optical fibers 140, the upcoverted optical signals corresponding to the selected RF frequency remain in proper phase relations at the outputs 141 of the optical fibers 140 for the optical interference (e.g., constructive and destructive interference) in the composite beams 160 and 185 to reproduce the RF scene at this selected RF frequency as an optical image on the detector 190 (as still and/or video image). This way, the image projected onto and detected by the detector 190 corresponds to the RF scene of the selected RF frequency received by antenna array 120. However, optical signals corresponding to RF frequencies outside this selected RF frequency will exit the optical fiber bundle without compensation for the phase differences caused by the different lengths of the optical fibers 140 in the optical fiber bundle and thus will be distributed across the detector 190 and appear as noise to the detector 190.

With the phase compensation as described with respect to FIG. 2D, the RF scene at the selected RF frequency is faithfully reconstructed in the optical domain, i.e., the interference pattern generated by the overlapping optical beams emanating from the fiber array corresponds to the RF scene at the selected frequency, plus distributed background (fixed-pattern 'noise') due to sources operating at other frequencies. As such, little or no additional (computational) processing is needed to determine the angle of arrival of waves at this frequency. Sources operating at frequencies different than the selected one contribute to the detected power, but their contribution is, in general, spread over multiple detectors. As a result, the contribution of such sources to the signal at any selected photodetector corresponding to a particular angle of arrival would be suppressed as compared to the frequency the receiver is 'tuned to.' Such contribution from out-of-band sources may be further suppressed by applying spectral filtering at the RF front end, i.e. before the up-conversion of the received RF signals to optical domain. Also or alternatively, optical filtering to suppress the contribution from out-of-band sources may be used.

In the exemplary implementation above, optical fibers with varying lengths were utilized however other means for effecting phase variation can be utilized. For example, true time delay lines—either adjustable or fixed—can be utilized to introduce length variation. Adjustable time delay provides the benefit of adjusting or fine tuning system operation on the fly.

The selected RF frequency 202 at which faithful optical reconstruction takes place (detected as an image by detector 190) may be selected by a user based on certain RF frequencies of interest and/or automatically changed rapidly by applying suitable bias or phase offset to the modulators. Hence, the received frequency may be scanned to reconstruct the distribution of RF sources in the k-space, i.e. finding the frequencies, intensities and angles of arrival of the received electromagnetic waves.

Multiple Independent k-Space Projections

Figure 8:
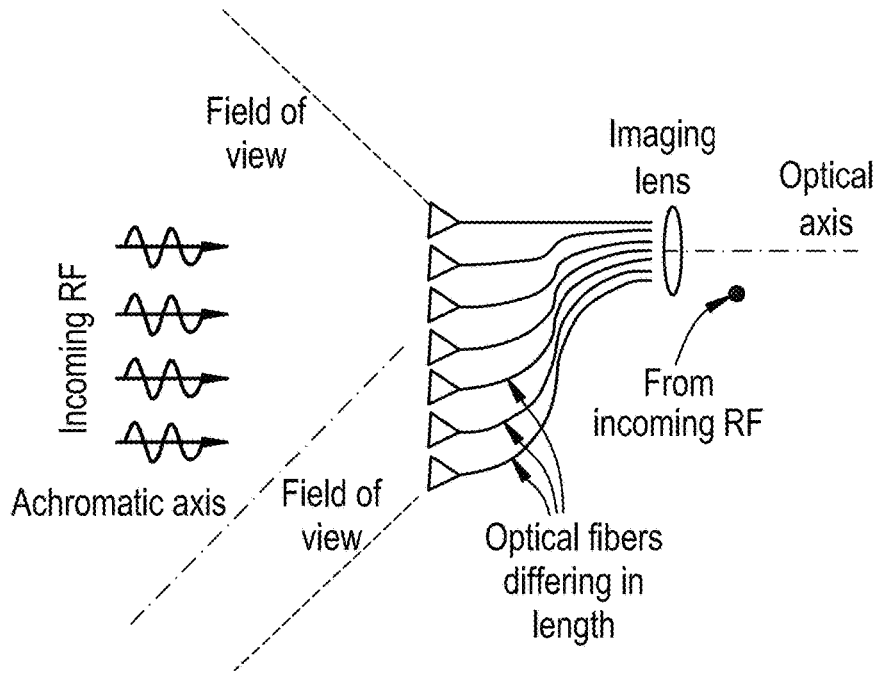
FIG. 8 is a schematic drawing illustrating an imaging receiver arranged so as to receive off-axis incidence for all received RF radiation.

As indicated in FIG. 4, equal fiber lengths in combination with homothetic arrays yield a particularly simple projection of the k-space in the optical reconstruction. On the other hand, purely random selection of fiber lengths yields projections of the type indicated in FIG. 5. By choosing the fiber lengths to vary linearly with the position of the antenna in the array, and homothetic arrays configuration, the projection of the k-space that deviates from that of FIG. 4, but one that is less complex than that of FIG. 5 may be obtained. Such a cuing-receiver configuration is shown in FIG. 8. One can think of such configuration as receiving all incoming RF radiation on one side of the achromatic axis.

As an example, in FIG. 8, the optical-fiber length corresponding to the antenna element at the top of the array is shorter than the optical fiber-fiber length corresponding to the element at the bottom. (It is noted that the fiber-length differences in FIG. 8 are shown for illustration purposes only, and may be considerably different in an actual implementation of the system.) As a result, an RF wave incoming along the line labeled in FIG. 8 as "Achromatic axis" would produce an optical wave-front parallel to the optical axis of the imaging lens, had it not been outside the field of view. On the other hand, the wave labeled as "incoming RF" would produce a spot off axis as shown in the figure.

Figure 9:
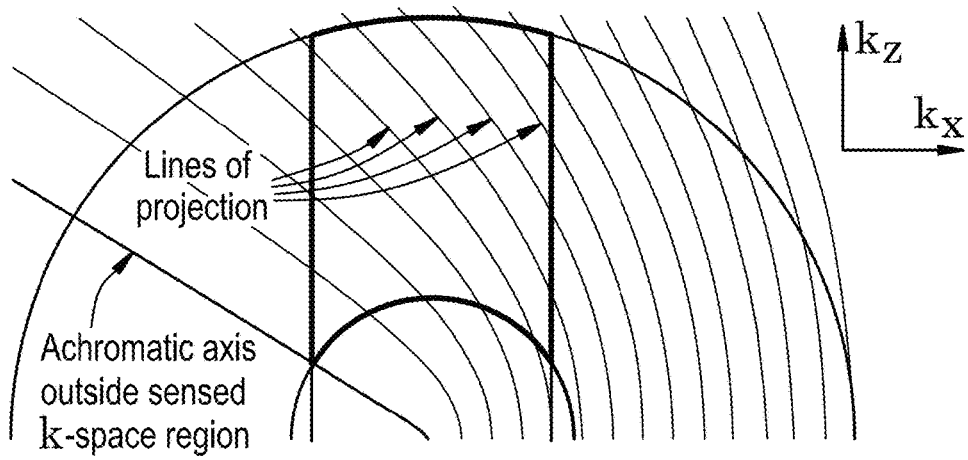
FIG. 9 depicts the projection of k-space in the receiver configuration of FIG. 8.

The manifestation of such receiver configuration in k-space is shown in FIG. 9. Compared to the configuration of equal-length fibers of FIG. 4, the projection lines are tilted in the k-space. As a result, mixing of the angle of arrival and frequencies occurs in the light distribution detected by the photodetector array. It is also possible to configure the array in such a way that the RF imaging axis (achromatic axis) falls outside the field of view of the antenna elements as shown in FIG. 8. Note that the field of view is determined by the acceptance angle of the individual elements of the antenna array.

Combining two receivers with different RF imaging axes, as in FIG. 10, yields two images of the same RF scene with different frequency-dependent shift in the optical reconstruction: Note that for the same two RF sources operating at frequencies $\Omega_1$ and $\Omega_2$, the image of source 1 is shifted down with respect to source 2 in imager with RF axis A, whereas it is shifted up in the imager with RF axis B.

Figure 11A:
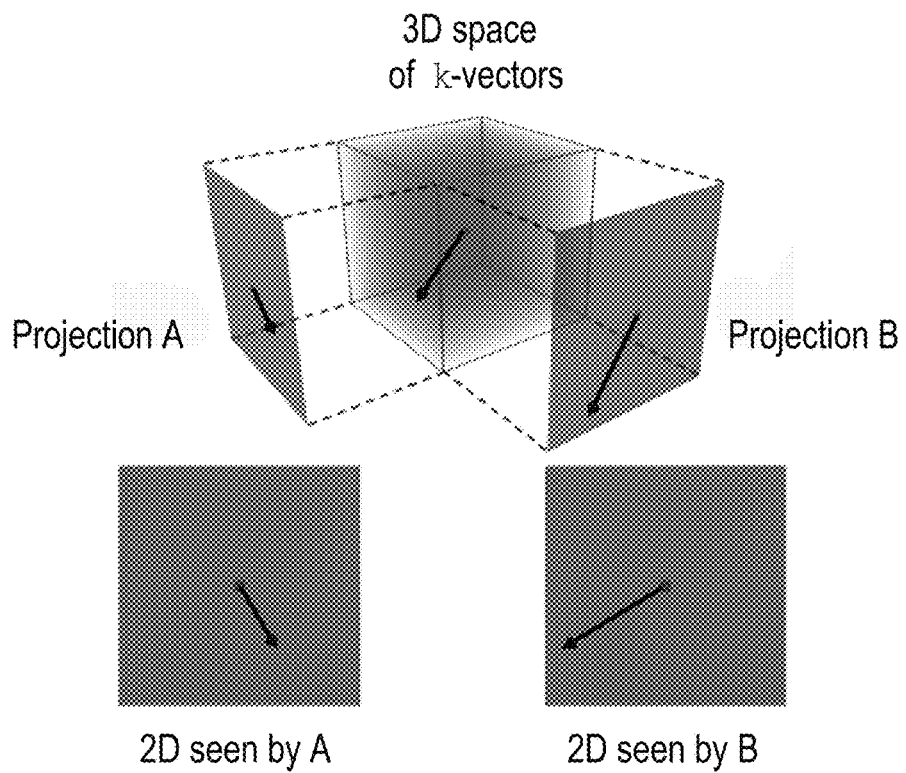
FIG. 11A is a schematic drawing illustrating a visualization of 3D k-vector space performed by two arrays.

In an abstract sense, the use of two arrays with different RF imaging axes can be visualized with the help of FIG. 11A. The 3D space of propagation vectors k is projected onto two dimensions along axes A and B corresponding to the two arrays. Accordingly, two 2D images are formed in the optical domain with the 3D k-vector corresponding to an incoming RF wave represented as a 2D vector in each of the arrays. Having the two 2D projections, the original 3D k-vector can be reconstructed computationally. This way, full information of the incoming wave, i.e. the AoA and the frequency, can be recovered from the two 2D images.

Figure 11B:
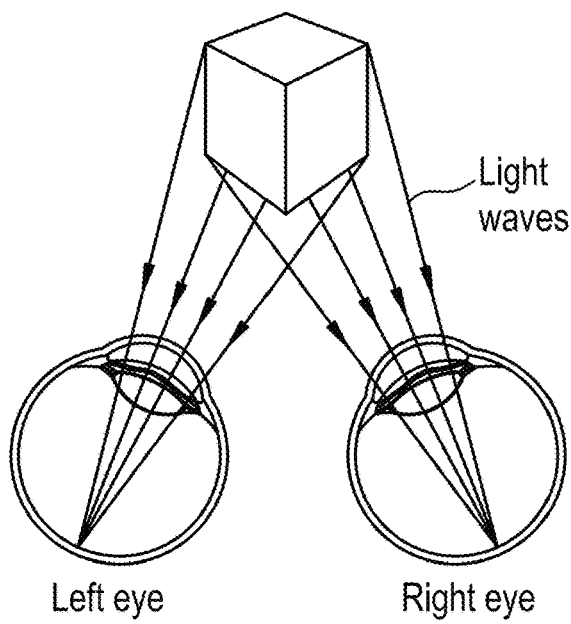
FIG. 11B is a schematic drawing illustrating a visualization of 3D real space performed by visual stereoscopic imaging.

The reconstruction of the 3D k-vector from two 2D projections can be compared to 3D real-space stereoscopic imaging, FIG. 11B. In that case, the image projected on the retina of each eye is two-dimensional, yet a 3D representation of the scene is reconstructed 'computationally' in the brain from two such images obtained by two projections along two optical axes of the left and right eyes. Similar computational reconstruction of the 3D k-vector space is performed in exemplary implementations of our invention.

Figure 12:
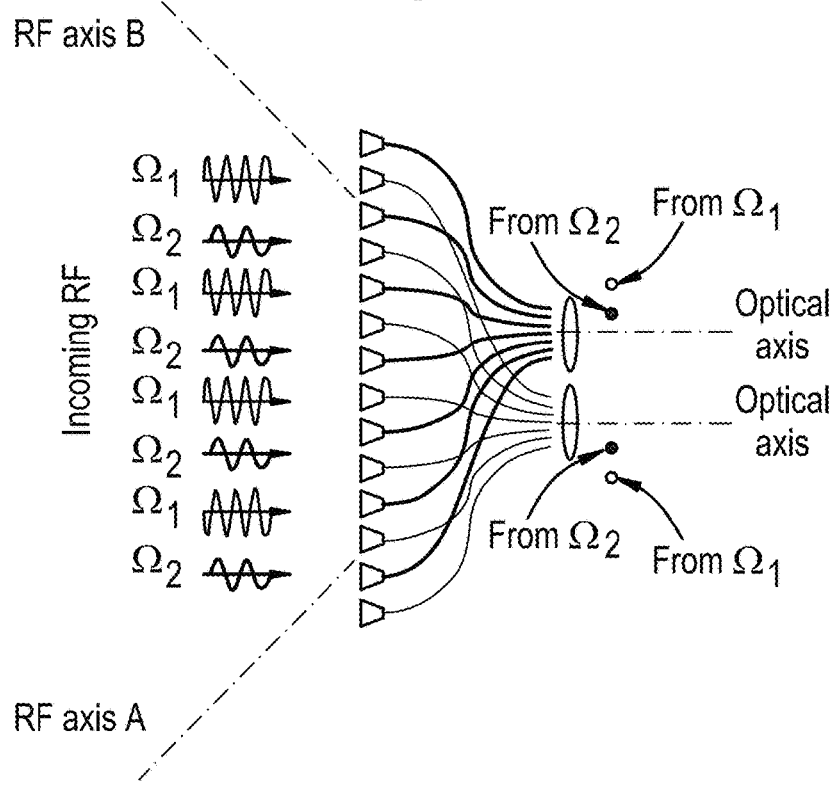
FIG. 12 is a schematic drawing illustrating a dual array for 3D k-space reconstruction with interleaved arrays.
Figure 13:
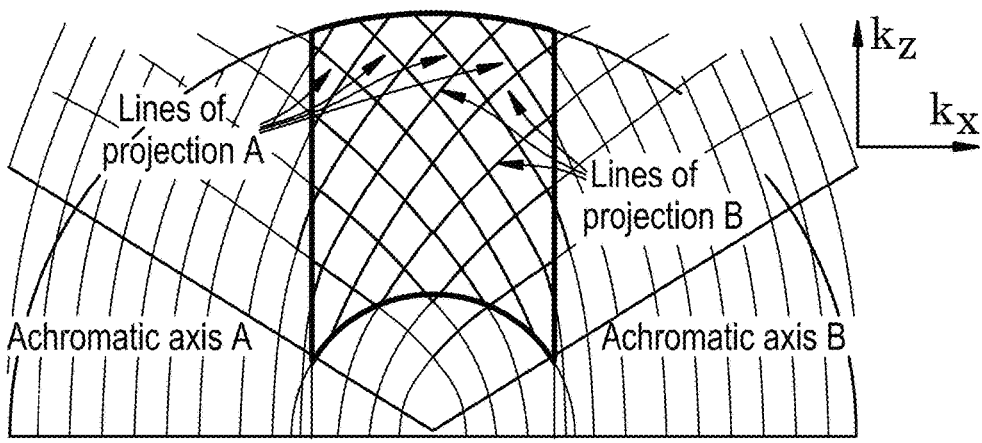
FIG. 13 depicts k-space representation of stereoscopic imager with two sets of lines of projection.

FIG. 13 is another illustration of the two projections of k-space. Two sets of projection lines are present, each set corresponding to one of the achromatic axes, see FIG. 12.

Although the 3D k-space reconstruction of the exemplary implementations are conceptually similar to the stereoscopic vision described above, there may be differences between these two cases. Whereas stereoscopic vision applies to imaging objects in real space, our system may apply to k-space—the space of k-vectors corresponding to plane waves. As a result, for the stereoscopic vision to be effective, the two parts of the imaging system must be offset spatially, as in the familiar Left-eye/Right-eye configuration of FIG. 11B; this is how the imaging axes are made non-parallel, and each eye presents a different view of the same subject. In contrast, since the imaging receiver performs projection in k-space, the two antenna arrays of the imaging receiver in FIG. 10 can be co-located as long as they present different imaging axes by, for example, properly choosing the optical fiber lengths.

The ability to co-locate the two arrays can be taken advantage by interleaving the antenna placement as in FIG. 12. This configuration can be thought of as consisting of a single antenna array with fibers collected in two separate bundles to form two optical images; each of the fiber bundles carries RF signals from antenna elements scattered throughout the array. The fiber lengths for each of the bundles are chosen so as to yield RF axes A and B, FIG. 12, similar to the RF axes of the two spatially-separated arrays of FIG. 10.

Figure 14:
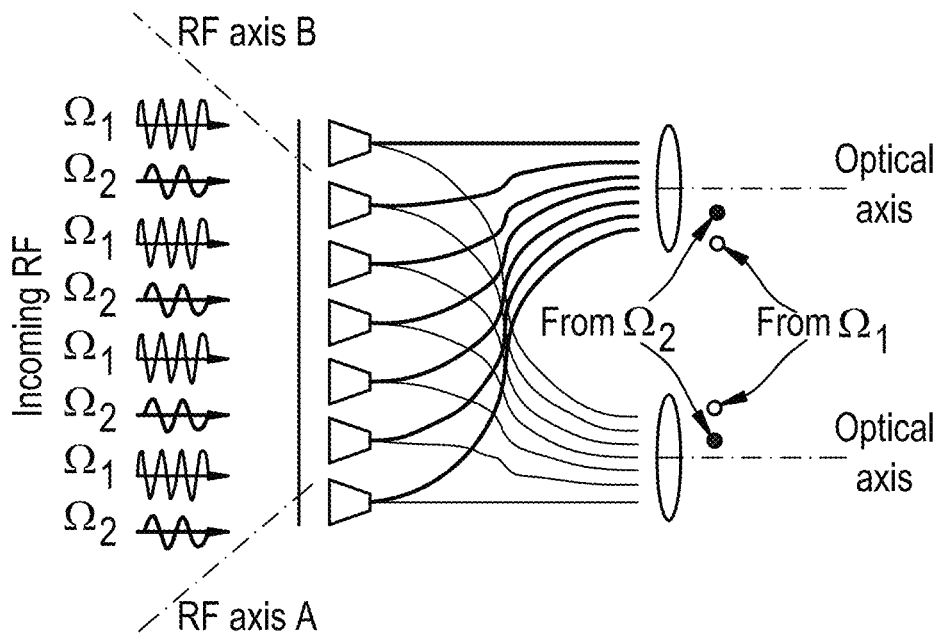
FIG. 14 is a schematic drawing illustrating a single array with two RF imaging axes.

The idea of co-locating the two arrays can be implemented as shown in FIG. 14 where a single antenna array is present. The modulated optical output of each antenna element is split into two, and the resulting two sets of fibers are collected into two fiber bundles to reconstruct two optical images. The lengths of the fibers in each of the bundles are chosen so as to produce different RF optical axes, labeled as RF axis A and RF axis B in FIG. 14. As a result of having originated from two different RF imaging axes, the two optical images correspond to two different projections of the 3D k-space, as explained in FIG. 11A, and therefore provide means to reconstructing the AoA and frequency of received RF waves.

For imaging receivers configured in such a way that the RF imaging axes fall outside the field of view of individual antennas, the system can be further simplified by combining optical reconstruction. Since the k-vector of the received incoming RF wave always falls to one side of the RF imaging axis, the resulting optical image will fall to one side of the optical axis. As a result, the two optical images form on the opposite sides of the optical axis. This allows combining the two optical systems into one where half of the image corresponds to the projection of the k-space along RF axis A, and the other half corresponds to the projection of the k-space along RF axis B.

The disclosed exemplary implementations may resolve the ambiguity in the angle of arrival (AoA) of electromagnetic radiation at the position of a distributed aperture. In addition, it provides information about the frequency of received radiation. The exemplary implementations may do so within the framework of imaging receiver concept wherein the incoming RF is up-converted to optical domain in the front end, i.e. at the individual antenna elements that constitute the receiving array, and conveyed with optical fibers to central location for processing.

The exemplary implementations allow the use of relatively slow photo-detector array for detector 190, one that need not respond at the RF frequencies received, to extract information about the RF source location (AoA) and the transmitted frequency. Although the disclosed exemplary implementations will also operate with the use of a relatively fast photo-detector array for detector 190, it is not necessary and may constitute a wasted extra expense. As described herein, each of the plural fiber optic bundles may have their optical outputs 141 imaged by the same detector 190 simultaneously or may each have their optical outputs 141 imaged by a different detector 190. In addition, the plural optical bundles may have their optical 141 outputs imaged separately and sequentially (e.g., rapidly switch the optical outputs 141 of each optical bundle on and off to detect the optical outputs at different times by detector 139). This latter implementation may be helpful when attempting to resolve ambiguities in analysis of certain optical patterns detected by detector 190 of the combined optical outputs 141 of plural fiber optic bundles onto detector 190.

To the best of our knowledge, prior to this invention, there was no way to resolve the AoA ambiguity within the imaging-receiver framework, absent post-detection (using fast photo-detector(s)) electronic processing to determine the incoming frequency.

The exemplary implementations may unambiguously pinpoint the location and frequency of an RF source with the imaging receiver.

The implementation of the general imaging receiver may require intensive computation to achieve faithful reconstruction of the RF scene. On the other hand, the use of 'stereoscopic' reconstruction with multiple projections of the k-space may in some circumstances lead to ambiguous reconstruction. For example, if multiple RF sources are transmitting simultaneously in the scene, there remains the possibility of assigning incorrect AoA and frequency in some circumstances. Such possibility can be related to the stereoscopic vision, compare FIG. 11B, which in most cases is sufficient to faithfully reconstruct a 3D scene, but allows optical illusions in some circumstances, with false impression of object placement and/or orientation in the scene.

This disadvantage can be overcome by increasing the number of arrays simultaneously trained on the scene (e.g., three or four or more arrays), with each array presenting a different RF imaging axis. Each additional array introduces additional constraints on the coincidental placement of RF sources and their frequencies that could lead to ambiguity. Therefore, each additional array reduces the likelihood of such a coincidence happening. Such arrangement can be compared to tomography where a series of projections at various angles, a computer-tomographic (CT) scan, allows the 3D reconstruction in real space. Since our invention relates to k-space, such reconstruction can be referred to as k-space tomography in our case. The reduced ambiguity is at the cost of increased computational complexity to reconstruct the RF scene.

Figure 16:
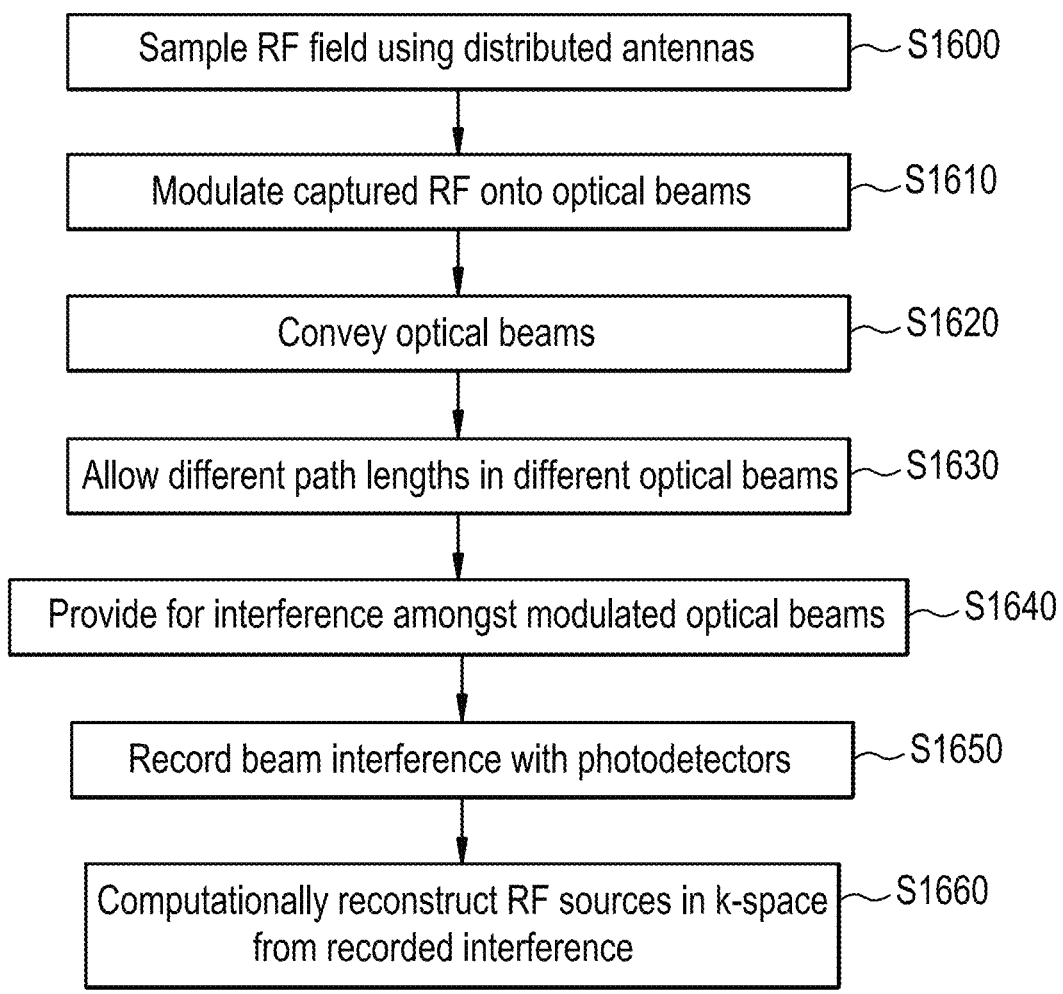
FIG. 16 is a flow chart of a method performed by an imaging receiver in accordance with the disclosed exemplary implementations.

FIG. 16 is a flow chart of a method performed by an imaging receiver configured in accordance with the disclosed exemplary implementations and FIGS. 1, 2A-C. In S1600, sampling of the RF signal field received at distributed antenna arrays is performed. In S1610, the sampled RF signals are modulated onto optical beams, and in S1620 the modulated signals are conveyed by, for example, optical fibers having varying lengths in accordance with S1630 so as to generate interference patterns amongst the modulated optical beams in S1640. The optical beam interference is recorded by photodetectors in S1650 and computational reconstruction of the RF signals in k-space is performed in S1660 using known techniques.

Figure 5:
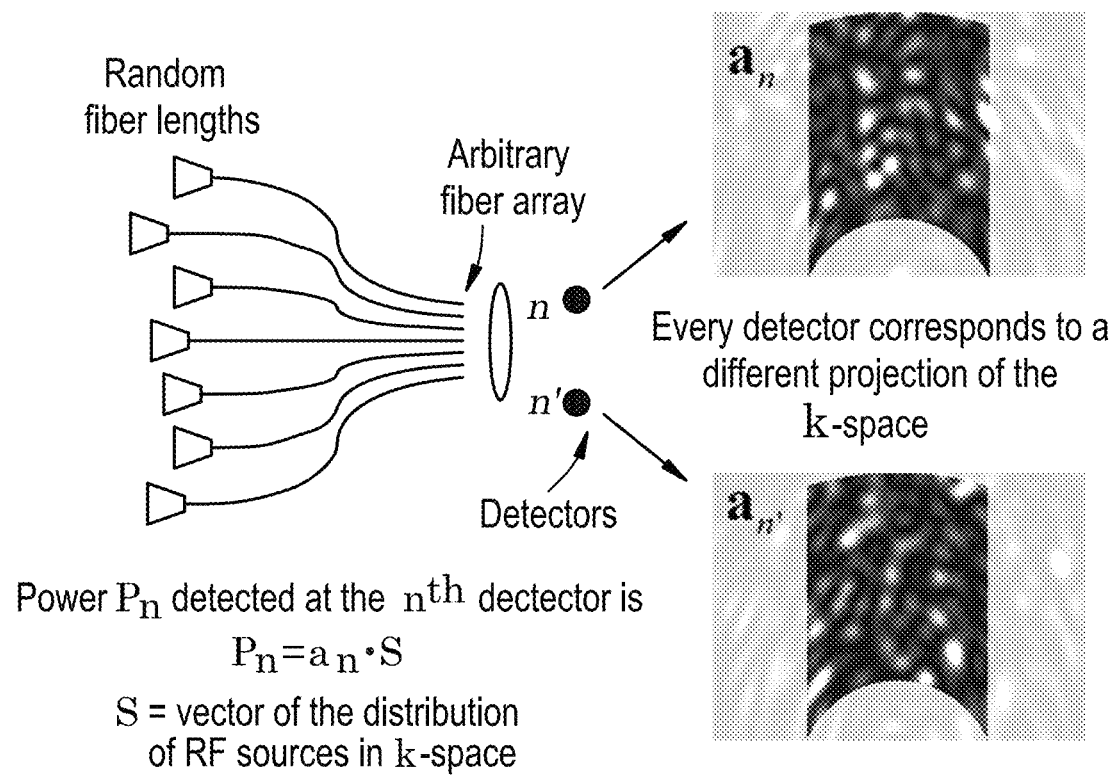
FIG. 5 is a schematic drawing illustrating of a generalized imaging receiver.
Figure 15:
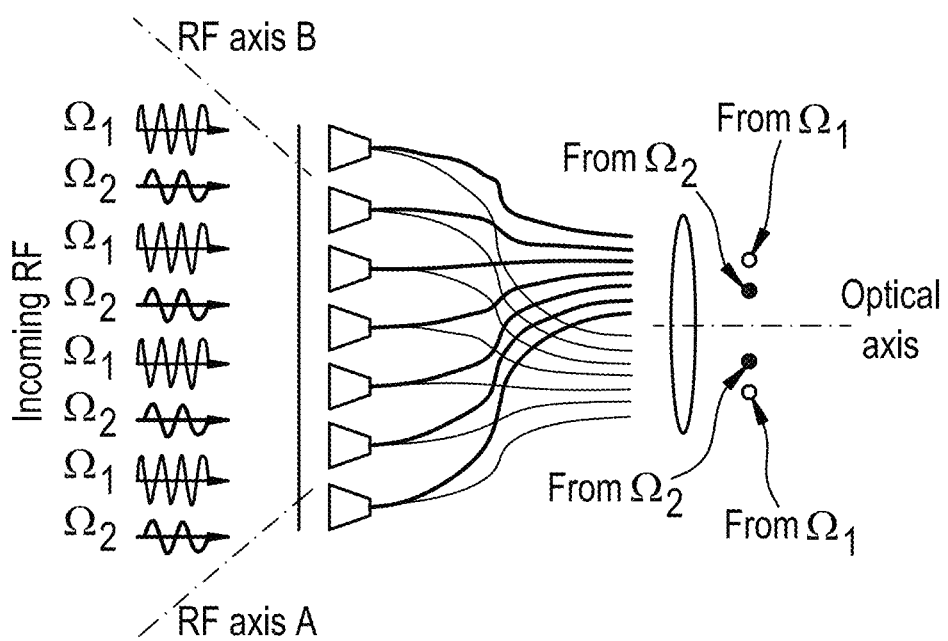
FIG. 15 is a schematic drawing illustrating a dual imaging receiver with shared optical reconstruction system.

One way of providing the different path lengths, per S1630 in FIG. 16, is by using optical fibers having varying lengths carrying the modulated optical beams to the photodetectors for each optical beam. In one exemplary implementation, the length of the fibers varies linearly in accordance with its position at the antenna/modulator array. An alternative methodology would be to use different configurations for the fiber array as compared to the antenna array as, for example, shown in FIG. 15. Another alternative would be to use arbitrary, e.g. random, fiber lengths as illustrated in FIG. 5. The range of fiber lengths may affect the spectral resolution of the obtained reconstruction of the RF scene. Thus, the spectral resolution may be determined by the largest difference in fiber length in accordance with well-known scientific principles. For example, if the largest fiber length difference leads to the relative delay between respective optical signals of 1 ns, then the spectral resolution, i.e. the ability of the system to distinctly resolve RF sources emitting at adjacent frequencies, may be about $2*(1 \text{ ns})^{-1} = 2$ GHz. The practical path length variations implemented in optical fiber may range between 0.5 mm and hundreds of meters.

It will be apparent to those of ordinary skill in the art that the inventive concepts described herein are not limited to the above exemplary implementations and the appended drawings and various changes in form and details may be made therein without departing from the spirit and scope of the following claims.

What is claimed:

1. An optical imaging receiver comprising:
   a phased-array antenna including a plurality of antenna elements configured to receive RF radiation from at least a first RF source, each antenna element configured to provide a corresponding RF signal in response to the received radiation;
   a plurality of electro-optic modulators each in communication with a corresponding one of the plurality of antenna elements, each modulator configured to modulate an optical carrier with a corresponding RF signal received from the corresponding one of the plurality of antenna elements to generate a corresponding modulated optical signal, the plurality of electro-optic modulators thereby generating a plurality of modulated optical signals;
   a plurality of optical waveguides configured to transmit the plurality of modulated optical signals, each of the plurality of optical waveguides having an output to emanate the corresponding modulated optical signal out of the corresponding optical waveguide to an interference space to provide interference amongst the modulated optical signals;
   a plurality of photodetectors to detect the optical signal interference; and
   a processor configured to determine frequency and location information of the first RF source as a function of the optical signal interference detected by the photodetectors.

2. The optical imaging receiver of claim 1, said plurality of optical waveguides comprising a plurality of optical fibers, the optical fibers having varying lengths.

3. The optical imaging receiver of claim 2, wherein at least two optical fibers of said plurality of optical fibers are connected to the output of a first one of the plurality of modulators.

4. The optical imaging receiver of claim 1, wherein the distribution of antennas in the phased-array antenna is non-coplanar.

5. The optical imaging receiver of claim 1, wherein the processor is configured to use a computational tomography technique to reconstruct the first RF source in k-space from the optical signal interference detected by the photodetectors.

6. The optical imaging receiver of claim 2, wherein lengths of the optical fibers vary linearly in accordance with corresponding positions of antennas in the antenna array to which they are in communication therewith.

7. A method utilized by an optical imaging receiver for RF signal processing, comprising:
receiving incoming RF radiation from at least one RF source at a phased-array antenna including a plurality of antenna elements arranged in a first pattern, each of the plurality of antenna elements generating a corresponding RF signal in response to the received radiation;
modulating each of the RF signals from each of the plurality of antenna elements onto an optical carrier to generate a plurality of modulated optical signals;
directing the plurality of modulated optical signals to an interference space to provide interference amongst the modulated optical signals;
detecting an interference pattern resulting from the interference of the modulated optical signals; and
computationally reconstructing the at least one RF source in k-space from the detected interference pattern.

8. The method of claim 7, wherein the plurality of modulated optical signals are directed to the interference space by a plurality of optical waveguides having varied path lengths.

9. The method of claim 8,
wherein the RF signals are modulated with corresponding electro-optic modulators to generate the plurality of modulated optical signals, and
wherein outputs of the modulated optical signals output by the electro-optic modulators are split into multiple waveguides and provided to the interference space.

10. The method of claim 7, wherein the distribution of antennas in the phased-array antenna is non-coplanar.

11. The method of claim 7, wherein computationally reconstructing involves using a computational tomography technique.

12. The method of claim 8, wherein the lengths of the waveguides vary linearly in accordance with corresponding positions of antennas in the antenna array to which they are in communication therewith.

13. The optical imaging receiver of claim 1, wherein outputs of the optical waveguides are arranged in a pattern that is independent from a pattern of the arrangement of the plurality of antennas with which the optical waveguides are in communication.

14. The optical imaging receiver of claim 1, wherein outputs of the optical waveguides are arranged in a first pattern, the plurality of antennas are arranged in a second pattern, wherein the first pattern correlates to the second pattern.

15. The optical imaging receiver of claim 14, wherein the first pattern is the same as the second pattern.

16. The optical imaging receiver of claim 1, wherein the plurality of optical waveguides comprise plural sets of optical fibers, and wherein each set of optical fibers is in communication with each of the plurality of antenna elements to provide corresponding modulated optical signals to the interference space.

17. The optical imaging receiver of claim 1, wherein, for each electro-optic modulator, multiple ones of the optical waveguides are configured to receive a corresponding modulated optical signal from the electro-optic modulator.

18. The optical imaging receive of claim 17, wherein the optical waveguides includes multiple optical fiber bundles to form multiple images.

19. The optical imaging receiver of claim 1,
wherein the processor is configured to determine corresponding frequency and location information of a plurality of RF sources in real time.

20. The optical imaging receiver of claim 19, wherein the processor is configured to determine in real time k-space information of each of the plurality of RF sources in an RF scene detected by the antenna array, the k-space information including, for each RF source, a frequency of the RF source and an angle of arrival of RF electromagnetic signals emitted by the RF source.

21. The method of claim 7,
wherein the plurality of modulated optical signals are directed to the interference space by a plurality of optical waveguides, and
wherein outputs of the optical waveguides are arranged in a pattern that is independent from a pattern of the arrangement of the plurality of antennas with which the optical waveguides are in communication.

22. The method of claim 7,
wherein the plurality of modulated optical signals are directed to the interference space by a plurality of optical waveguides, and
wherein outputs of the optical waveguides are arranged in a first pattern, the plurality of antennas are arranged in a second pattern, wherein the first pattern correlates to the second pattern.

23. The method of claim 22, wherein the first pattern is the same as the second pattern.

24. The method of claim 7, wherein each of the plurality of modulated optical signals are split and directed to the interference space with plural sets of optical waveguides.

25. The method of claim 7, wherein the plural sets of optical waveguides are plural sets of optical fibers, and wherein each set of optical fibers is in communication with each of the plurality of antenna elements to provide corresponding modulated optical signals to the interference space.

26. The method of claim 25, wherein the sets of optical fibers are separate from each other at the interference space.

27. The method of claim 25, wherein the optical fibers of the plural sets of optical fibers are interposed with each other at the interference space.

28. The method of claim 7, wherein computationally reconstructing the at least one RF source in k-space from the detected interference pattern comprises determining corresponding frequency and location information of plural RF sources in real time.

29. The method of claim 7, wherein computationally reconstructing the at least one RF source in k-space from the detected interference pattern is performed in real time.

30. A receiver comprising:
a phased-array antenna array including a plurality of antennas to receive RF radiation from a plurality of RF sources, each antenna being configured to output a corresponding RF signal in response to the received radiation;

a plurality of electro-optic modulators each in communication with a corresponding one of the plurality of antennas, each modulator configured to modulate an optical carrier with a corresponding RF signal received from the corresponding one of the plurality of antennas to generate a corresponding modulated optical signal, the plurality of electro-optic modulators thereby generating a plurality of modulated optical signals;

a first set of optical waveguides configured to receive the plurality of modulated optical signals from the plurality of electro-optic modulators, each of the first set of optical waveguides having an output to emanate a corresponding modulated optical signal to generate an interference pattern provided by interference amongst the plurality of modulated optical signals output by the first set of optical waveguides;

a plurality of photodetectors configured to detect the interference pattern; and a processor configured to determine in real time frequency and location information of each of the plurality of RF sources based upon the interference pattern detected by the photodetectors.

31. The receiver of claim 30, further comprising a second set of optical waveguides configured to receive the plurality of modulated optical signals from the plurality of electro-optic modulators, each of the second set of optical waveguides having an output to emanate a corresponding modulated optical signal to provide interference amongst the plurality of modulated optical signals output by the second set of optical waveguides.

32. The receiver of claim 31, wherein each of the first and second sets of waveguides have their outputs arranged adjacent to an interference space to emanate the plurality of modulated optical signals into the interference space.

33. The receiver of claim 32, wherein the outputs of the first and second sets of waveguides are separate from each other at the interference space.

34. The receiver of claim 32, wherein the outputs of first and second sets of waveguides are interposed with each other at the interference space.

35. The receiver of claim 32, wherein outputs of each of the first and second sets of waveguides are arranged in a pattern that is independent from a pattern of the arrangement of the plurality of antennas.

36. The receiver of claim 32, outputs of each of the first and second sets of waveguides are each arranged in a first pattern, wherein the plurality of antennas are arranged in a second pattern, and wherein the first pattern correlates to the second pattern.

37. The receiver of claim 36, wherein the first pattern is the same as the second pattern.

38. The receiver of claim 32, wherein optical path lengths of the first and second sets of waveguides are varied.

39. The receiver of claim 30,
wherein outputs of the first set of optical waveguides are arranged in a first geometric pattern,
wherein the antennas to which the first set of optical waveguides are in communication with are arranged in a second geometric pattern, and
wherein the first geometric pattern is uncorrelated to the second geometric pattern.

40. The receiver of claim 30,
wherein outputs of the first set of optical waveguides are arranged in a first pattern,
wherein the antennas to which the first set of optical waveguides are in communication with are arranged in a second pattern, and
wherein the first pattern correlates to the second pattern.

41. The receiver of claim 40, wherein the first pattern is the same as the second pattern.

42. The receiver of claim 30, wherein the distribution of antennas in the phased-array antenna array is non-coplanar.

43. The receiver of claim 30, wherein optical path lengths of the first set of waveguides are varied.

* * * * *